(12) United States Patent
Mei et al.

(10) Patent No.: US 10,949,530 B2
(45) Date of Patent: Mar. 16, 2021

(54) TRANSACTION METHOD, TRANSACTION INFORMATION PROCESSING METHOD, TRANSACTION TERMINAL, AND SERVER

(71) Applicant: HUAWEI TECHNOLOGIES CO., LTD., Shenzhen (CN)

(72) Inventors: Jingqing Mei, Beijing (CN); Guoqing Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 16/090,243

(22) PCT Filed: Mar. 30, 2016

(86) PCT No.: PCT/CN2016/077899
§ 371 (c)(1),
(2) Date: Sep. 29, 2018

(87) PCT Pub. No.: WO2017/166135
PCT Pub. Date: Oct. 5, 2017

(65) Prior Publication Data
US 2019/0114620 A1 Apr. 18, 2019

(51) Int. Cl.
*G06F 21/53* (2013.01)
*G06F 21/62* (2013.01)
(Continued)

(52) U.S. Cl.
CPC .............. *G06F 21/53* (2013.01); *G06F 21/62* (2013.01); *G06Q 20/206* (2013.01);
(Continued)

(58) Field of Classification Search
CPC ......... H04L 9/088; H04L 9/0897; H04L 9/14; G06F 21/53; G06F 21/62
See application file for complete search history.

(56) References Cited

U.S. PATENT DOCUMENTS 8,275,355 B2 * 9/2012 Huang ................ H04L 63/0892
455/410
2012/0159105 A1 * 6/2012 von Behren ...... H04W 12/0023
711/164
(Continued)

FOREIGN PATENT DOCUMENTS

CN 103067335 A 4/2013
CN 104063790 A 9/2014
(Continued)

*Primary Examiner* — Sher A Khan
(74) *Attorney, Agent, or Firm* — Kilpatrick Townsend & Stockton LLP

(57) ABSTRACT

A transaction method includes: receiving, by a secure function module of a transaction terminal, a first transaction message sent by a transaction application module, where the first transaction message includes a first identifier and/or a secure transaction data requirement parameter; obtaining, by the secure function module, secure transaction data according to the first transaction message, or the first transaction message and a second identifier, where the second identifier is used to uniquely identify the secure function module; sending, by the secure function module, the secure transaction data to the transaction application module; and sending, by the transaction application module, a second transaction message to an acquiring terminal, where the second transaction message includes the secure transaction data, the first identifier, and a third identifier, and the third identifier is used to identify the transaction terminal.

14 Claims, 6 Drawing Sheets

(51) Int. Cl.
*G06Q 20/32* (2012.01)
*H04L 9/08* (2006.01)
*H04L 9/14* (2006.01)
*G06Q 20/34* (2012.01)
*G06Q 20/20* (2012.01)
*G06Q 20/38* (2012.01)
*G06Q 20/40* (2012.01)
*H04W 4/80* (2018.01)

(52) U.S. Cl.
CPC ....... *G06Q 20/3278* (2013.01); *G06Q 20/351* (2013.01); *G06Q 20/3821* (2013.01); *G06Q 20/401* (2013.01); *H04L 9/088* (2013.01); *H04L 9/0897* (2013.01); *H04L 9/14* (2013.01); *H04L 2209/56* (2013.01); *H04W 4/80* (2018.02)

(56) References Cited

U.S. PATENT DOCUMENTS

| | | | | |
|---|---|---|---|---|
| 2012/0226582 | A1* | 9/2012 | Hammad | H04L 9/3234 705/26.41 |
| 2013/0178159 | A1 | 7/2013 | Xie et al. | |
| 2013/0297515 | A1* | 11/2013 | Dinan | G06Q 20/3829 705/71 |
| 2013/0347064 | A1* | 12/2013 | Aissi | G06F 21/44 726/2 |
| 2014/0101716 | A1* | 4/2014 | Touboul | H04L 63/10 726/1 |
| 2015/0019442 | A1 | 1/2015 | Hird et al. | |
| 2015/0019443 | A1 | 1/2015 | Sheets et al. | |
| 2015/0020160 | A1* | 1/2015 | Goncalves | G06Q 20/3227 726/3 |
| 2015/0178724 | A1 | 6/2015 | Ngo et al. | |
| 2015/0181418 | A1 | 6/2015 | Gargiulo et al. | |
| 2016/0019536 | A1 | 1/2016 | Ortiz et al. | |
| 2016/0078437 | A1* | 3/2016 | Tahon | H04L 9/14 705/77 |
| 2016/0335619 | A1 | 11/2016 | Ce | |
| 2017/0142159 | A1 | 5/2017 | Li et al. | |
| 2017/0357960 | A1* | 12/2017 | Quentin | H04L 63/10 |
| 2017/0364911 | A1* | 12/2017 | Landrok | H04L 9/3228 |

FOREIGN PATENT DOCUMENTS

| | | |
|---|---|---|
| CN | 104283687 A | 1/2015 |
| CN | 104380777 A | 2/2015 |
| CN | 104471600 A | 3/2015 |
| CN | 204360381 U | 5/2015 |
| CN | 104881779 A | 9/2015 |
| EP | 2911076 A1 | 8/2015 |
| WO | 2013155627 A1 | 10/2013 |
| WO | 2015009765 A1 | 1/2015 |
| WO | 2016033499 A1 | 3/2016 |

\* cited by examiner

TRANSACTION METHOD, TRANSACTION INFORMATION PROCESSING METHOD, TRANSACTION TERMINAL, AND SERVER

CROSS-REFERENCE TO RELATED APPLICATIONS

This application is a National Stage of International Application No. PCT/CN2016/077899, filed on Mar. 30, 2016, which is hereby incorporated by reference in its entirety.

TECHNICAL FIELD

The present invention relates to the communications field, and in particular, to a transaction method, a transaction information processing method, a transaction terminal, and a server.

BACKGROUND

A card emulation (Card Emulation, CE) function is to emulate a contactless IC card (Contactless IC Card) by using a terminal that supports a near field communication (Near Field Communication, NFC) function and has a secure element (Secure Element, SE). A card emulation application is installed in the SE of the terminal, and runs in the SE. The SE generally allows installation of a plurality of CE applications. For a user, carrying the terminal is equivalent to carrying a plurality of physical cards, and this brings great convenience to the user.

Host card emulation (Host-based Card Emulation or Host Card Emulation, HCE) is to directly install a card emulation application in an operating system of the terminal like an ordinary application, and run the card emulation application on a terminal host (Device Host, or referred to as a device host), without installing the card emulation application in the secure element. HCE is extensively applied in near field communication (Near Field Communication, NFC).

Currently, an HCE application performs communication by using an NFC interface of the terminal and a POS machine or a card reading device such as a card reader. Currently, the HCE application usually stores application data in a rich execution environment REE (Rich Execution Environment). The REE is a running environment at a relatively low security level, that is, an application program from any source, when allowed by the user, can be installed in the REE of the terminal. Therefore, with respect to some HCE payment applications that require relatively high security, for example, an HCE payment application released by a bank, a malicious program can easily steal critical information of the HCE payment applications, for example, bank transaction account information, a security credential used for a transaction (for example, a transaction token Token), and a key used for encryption processing of transaction information. Therefore, the critical information of the HCE application is usually stored on a server. When the terminal uses the HCE application to perform a transaction, the terminal needs to connect to the Internet, and complete the transaction depending on the server.

SUMMARY

Embodiments of the present invention provide a transaction method, a transaction information processing method, a transaction terminal, and a server, so that the transaction terminal can locally store and process transaction data and critical information securely. This avoids a requirement for connecting to the Internet during a transaction and improves transaction efficiency.

To achieve the foregoing objectives, the following technical solutions are used in the embodiments of the present invention.

According to a first aspect, a transaction method is disclosed and applied to a transaction terminal, where the transaction terminal includes a secure function module and at least one transaction application module. In addition, the method provided by the present invention is applicable to a transaction system, where the system includes the transaction terminal, an acquiring terminal, and a server.

The method includes the following steps: First, the secure function module of the transaction terminal receives a first transaction message sent by the transaction application module. Herein the transaction application module is any one of the at least one transaction application module included in the transaction terminal, and the secure function module runs in a TEE (Trust Execution Environment, trusted execution environment) in the transaction terminal. In addition, the first transaction message includes a first identifier and/or a secure transaction data requirement parameter, and the first identifier is used to identify the transaction application module or a virtual card currently used by the transaction application module. The virtual card is a software entity that has no physical medium and can be loaded to a host card emulation application and interact with a POS by using a communications link provided by the terminal, to complete payment. The virtual card may be generated depending on a physical card issued by a bank, or may be a virtual card that is issued by a bank and has no physical medium.

The secure transaction data requirement parameter includes at least one of the following parameters: a secure transaction data length parameter or a secure transaction data encryption type parameter. The secure transaction data length parameter is used to indicate a required length of secure transaction data provided by the secure function module. The secure transaction data encryption type parameter is used to indicate an encryption type of the secure transaction data in the provided secure transaction data, for example, encryption or not, or a type of a used encryption algorithm (for example, a symmetric encryption algorithm or an asymmetric encryption algorithm), or a type of a used encryption algorithm (for example, an AES algorithm), or the like.

Then the secure function module obtains the secure transaction data according to the first transaction message, or the first transaction message and a second identifier. Herein the second identifier is used to identify the secure function module. The secure transaction data is data that can be used during a transaction to enhance security, for example, a transaction token, or transaction information after encryption processing.

Then the secure function module sends the obtained secure transaction data to the transaction application module.

It should be noted that, herein the secure function module obtains the secure transaction data in the transaction terminal locally. In a specific implementation, the secure transaction data prestored in the transaction terminal may be obtained, or the secure transaction data may be obtained by using a specific rule.

Finally, the transaction application module sends a second transaction message to the acquiring terminal, where the second transaction message includes the secure transaction data, the first identifier, and the third identifier, and the third identifier is used to identify the transaction terminal, so that the acquiring terminal forwards a third transaction message to the server for transaction processing, where the third transaction message is the second transaction message or is generated by the acquiring terminal according to the second transaction message, and the third transaction message includes the secure transaction data, the first identifier, and the third identifier.

It should be noted that, the first identifier included in the second transaction message may be independent of the secure transaction data, that is, existent in parallel with the secure transaction data in the second transaction message, or may be included in the secure transaction data, that is, used as a part of the secure transaction data. Likewise, the first identifier included in the third transaction message may be independent of the secure transaction data, that is, existent in parallel with the secure transaction data in the third transaction message, or may be included in the secure transaction data, that is, used as a part of the secure transaction data.

In the transaction method provided by the present invention, the secure function module included in the transaction terminal can obtain the secure transaction data locally. The terminal does not need to obtain the secure transaction data (for example, a transaction token Token) online from a cloud processor during the transaction, and can perform the transaction according to the secure transaction data obtained by the terminal locally. The transaction is not limited by network conditions, and transaction efficiency is improved. In addition, there is no need to develop different secure function modules for every transaction application module, and therefore, industrial costs are reduced.

With reference to the first aspect, in a first possible implementation of the first aspect, before the secure function module obtains the secure transaction data according to the first transaction message, or the first transaction message and the second identifier, the method further includes:

The secure function module receives transaction information sent by the transaction application module. Herein the transaction information is secure auxiliary data information or service data that is used in a transaction process, for example, security verification data or transaction settlement data. For example, the transaction information includes fee deduction information (for example, an authorized amount or a terminal verification result) received by the transaction application module from the POS and virtual card information stored by the transaction application module, where the virtual card information includes a transaction counter, an application interaction feature, and the like.

It should be noted that, the transaction information may be included in the first transaction message and sent by the transaction application module to the secure function module, or may be sent by the transaction application module to the secure function module by using another message after the secure function module receives the first transaction message sent by the transaction application module.

With reference to the first aspect or the first possible implementation of the first aspect, in a second possible implementation of the first aspect, that the secure function module obtains the secure transaction data according to the first transaction message, or the first transaction message and a second identifier specifically includes:

The secure function module uses one of at least one piece of first secure processing data corresponding to the first identifier as the secure transaction data. The first secure processing data is generated by the server for the first identifier in the transaction terminal, that is, can be used only as the secure transaction data of the transaction application corresponding to the first identifier in the transaction terminal, and cannot be used as secure transaction data of another transaction application. The first secure processing data is obtained by the secure function module from the server in advance and stored in the TEE.

Alternatively, the secure function module obtains second secure processing data according to a first rule corresponding to the first identifier. The secure function module uses the second secure processing data as the secure transaction data, or the secure function module forms the secure transaction data according to the first identifier and the second secure processing data. The first rule is preset by the secure function module or obtained from the server, and the first rule includes a first algorithm and a first numeric value (such as a character string or a numeral). Herein the first algorithm is an irreversible encryption algorithm, such as a hash algorithm.

Alternatively, the secure function module may further obtain third secure processing data by encrypting first data according to a second rule corresponding to the first identifier, where the first data includes the transaction information and/or the second identifier, and further use the third secure processing data as the secure transaction data. The second rule is preset by the secure function module or obtained from the server, and the second rule includes a first encryption algorithm and at least one first key. Herein the first encryption algorithm may be a symmetric encryption algorithm or an asymmetric encryption algorithm.

In this way, the transaction terminal can obtain the secure transaction data according to the first transaction message, or the first transaction and the second identifier, and does not need to obtain the secure transaction data online during the transaction. In addition, there is no need to develop different secure function modules for every transaction application module, and therefore, industrial costs are reduced.

With reference to the first aspect or the first possible implementation of the first aspect, in a third possible implementation of the first aspect, that the secure function module obtains the secure transaction data according to the first transaction message, or the first transaction message and a second identifier specifically includes:

The secure function module uses one of at least one piece of fourth secure processing data corresponding to the secure transaction data requirement parameter as the secure transaction data. Herein the secure transaction data requirement parameter is the secure transaction data length parameter and/or the secure transaction data encryption type parameter carried in the first transaction message. The at least one piece of fourth secure processing data complies with all the secure transaction data requirement parameters carried in the first transaction message. The at least one piece of fourth secure processing data is generated by the server according to the secure transaction data requirement parameter, and obtained by the secure function module from the server in advance and stored in the trusted execution environment.

Alternatively, the secure function module generates fifth secure processing data according to a third rule corresponding to the secure transaction data requirement parameter, and the secure function module uses the fifth secure processing data as the secure transaction data, or the secure function module forms the secure transaction data according to the first identifier and the fifth secure processing data. Herein the third rule is preset by the secure function module or obtained from the server, and the third rule includes a second algorithm and a second numeric value (such as a character string or a numeral). Herein the second algorithm is an irreversible encryption algorithm, such as a hash algorithm.

Alternatively, the secure function module obtains sixth secure processing data by encrypting second data according to a fourth rule corresponding to the secure transaction data requirement parameter, where the fourth rule is preset by the secure function module or obtained from the server, the fourth rule includes a second encryption algorithm and at least one second key, and the second data includes the transaction information and/or the second identifier. The secure function module uses the sixth secure processing data as the secure transaction data. Herein the second encryption algorithm may be a symmetric encryption algorithm or an asymmetric encryption algorithm.

The transaction terminal can obtain the secure transaction data locally according to the secure transaction data requirement parameter included in the first transaction message, and does not need to obtain the secure transaction data online during the transaction. The transaction is not affected by network conditions, and transaction efficiency is improved. In addition, there is no need to develop different secure function modules for every transaction application, and therefore, industrial costs are reduced.

With reference to the first aspect, in a fourth possible implementation of the first aspect, before the secure function module receives the first transaction message sent by the transaction application module, the method further includes:

The transaction application module submits a registration request message to the server, where the registration request message includes the first identifier, transaction account information corresponding to the transaction application module, and the third identifier, and the third identifier is used to identify the transaction terminal, so that the server records the first identifier, the transaction account information corresponding to the transaction application module, and the third identifier. Therefore, the server can uniquely determine, according to the first identifier and the third identifier, the transaction account information corresponding to the transaction application module. For example, the transaction account information includes a personal account number PAN (Personal Account Number).

With reference to the first aspect or the first possible implementation of the first aspect, in a fifth possible implementation of the first aspect, the transaction terminal further includes a check module, and before the secure function module receives the first transaction message sent by the transaction application module, the method further includes:

The check module performs a security check. Herein the security check method includes at least one of a password check or a biological feature check. The biological feature check includes at least one of a fingerprint check, an iris check, a voiceprint check, facial recognition, PPG recognition, or ECG recognition. The check module may be a fingerprint recognition module, a camera recognition module, an iris recognition module, or a password check module. Different check modes are implemented by different check modules. The fingerprint check is implemented by the fingerprint recognition module. The iris check is implemented by the camera or iris recognition module. The password check is implemented by the password check module.

If the check module determines that a result of the security check is success, the check module sends the first transaction message to the secure function module, or else, does not send the first transaction message to the secure function module.

With reference to the first aspect or the first possible implementation of the first aspect, in a sixth possible implementation of the first aspect, before the check module performs the security check, the method further includes:

The transaction application module generates the first transaction message, and determines, according to the first transaction message, that the security check needs to be performed.

Specifically, the first transaction message includes the first identifier and/or the secure transaction data requirement parameter. The check module determines, according to the first identifier and/or the secure transaction data requirement parameter, that the security check needs to be performed.

According to a second aspect, a transaction method is disclosed, and applied to a transaction system, where the system includes a transaction terminal, an acquiring terminal, and a server, and the method includes the following steps:

First, the server receives a third transaction message from the acquiring terminal, where the third transaction message includes secure transaction data, a first identifier, and a third identifier, the secure transaction data is generated by a secure function module of the transaction terminal after the secure function module receives a first transaction message sent by a transaction application module, the transaction application module is one of at least one transaction application module included in the transaction terminal, the first identifier is used to identify the transaction application module or a virtual card currently used by the transaction application module, and the third identifier is used to identify the transaction terminal.

Then the server obtains the first identifier and the third identifier according to the third transaction message, and performs a transaction check on the secure transaction data.

Then the server determines that a result of the transaction check is success, and determines a transaction account according to the first identifier and the third identifier.

Finally, the server performs transaction processing on the transaction account, and sends a transaction result to the acquiring terminal.

During a transaction, the server receives the secure transaction data obtained by the transaction terminal locally, determines the transaction account, and performs corresponding transaction processing. Therefore, when the transaction terminal obtains the secure transaction data online to perform the transaction, the transaction is not affected by network conditions, and transaction efficiency is improved. In addition, there is no need to develop different secure function modules for every transaction application, and therefore, industrial costs are reduced.

With reference to the second aspect, in a first possible implementation of the second aspect, before the server receives the third transaction message from the acquiring terminal, the method further includes:

receiving registration request information sent by the transaction application module, where the registration request information includes the first identifier, the transaction account information corresponding to the transaction application module, and the third identifier; and storing the first identifier, the transaction account information corresponding to the transaction application module, and the third identifier, so that the server can uniquely determine, according to the first identifier and the third identifier, the transaction account information corresponding to the transaction application module.

It should be noted that, a second identifier may also be recorded on the server. The second identifier is used to identify the secure function module in the transaction terminal corresponding to the third identifier. The second identifier uniquely corresponds to the third identifier. Therefore, the server can also uniquely determine, according to the first identifier and the second identifier, the transaction account information corresponding to the transaction application module.

With reference to the first possible implementation of the second aspect, in a second possible implementation of the second aspect, that the server obtains the first identifier and the third identifier according to the third transaction message, and performs a transaction check on the secure transaction data specifically includes:

The server determines corresponding seventh secure processing data according to the first identifier and the third identifier, and performs the transaction check on the secure transaction data by using the seventh secure processing data. The seventh secure processing data is generated by the server in advance for the first identifier in the transaction terminal corresponding to the third identifier. If the first secure processing data is the same as the secure transaction data, the result of the transaction check is success; otherwise, the transaction check fails.

Alternatively, the server determines a corresponding fifth rule according to the first identifier and the third identifier, obtains eighth secure processing data according to the fifth rule, and performs the check on the secure transaction data by using the eighth secure processing data. The fifth rule includes a third algorithm and a third numeric value, the fifth rule corresponds to a first rule corresponding to the first identifier in the secure function module in the transaction terminal, and the first rule includes a first algorithm and a first numeric value. Herein the correspondence between the fifth rule and the first rule indicates that the third algorithm is the same as the first algorithm, and that the third numeric value is the same as the first numeric value. In addition, the first rule is preset by the secure function module or obtained from the server, and is used to obtain the secure transaction data. Specifically, if the eighth secure processing data is the same as the secure transaction data, the result of the transaction check is success; otherwise, the transaction check fails.

It should be noted that, on the server, the fifth rule corresponds to the first identifier and the third identifier, that is, the server can uniquely determine the corresponding fifth rule according to the first identifier and the third identifier. It should be noted that, because on the server, the second identifier also uniquely corresponds to the third identifier, the server can also uniquely determine the corresponding fifth rule according to the first identifier and the second identifier.

For example, the fifth rule corresponds to the first rule, that is, the first rule and the fifth rule include a same numeric value A (such as a numeral or a character string) and a same algorithm B (such as a hash function). When receiving the first transaction message, the secure function module obtains the secure transaction data by calculating the numeric value A plus a current time by using the algorithm B, and sends the second transaction message to the acquiring terminal. The second transaction message includes the secure transaction data, the first identifier, and the third identifier. Then the server receives the third transaction message from the acquiring terminal. The third transaction message is the second transaction message or is generated by the acquiring terminal according to the second transaction message, and includes at least the secure transaction data, the first identifier, and the third identifier. After obtaining the first identifier and the third identifier, the server determines the corresponding fifth rule, also calculates the numeric value A plus the current time by using the algorithm B, to obtain second secure processing data used for checking, and compares the second secure processing data with the received secure transaction data to implement verification.

Alternatively, the server determines a corresponding sixth rule according to the first identifier and the third identifier, and performs the check on the secure transaction data according to the sixth rule. Specifically, the server processes the secure transaction data according to the sixth rule to obtain first data. If the first data includes transaction information satisfying a predetermined requirement (for example, content satisfies an agreed requirement and can be parsed successfully) and/or the second identifier, the check succeeds; otherwise, the check fails. The sixth rule includes a third encryption algorithm and at least one third key, the sixth rule corresponds to a second rule of the secure function module in the transaction terminal, and the second rule includes a first encryption algorithm and at least one first key. Herein the correspondence between the sixth rule and the second rule indicates that the sixth rule may be used to perform decryption processing on data encrypted by the second rule to obtain unencrypted data. The second rule is preset by the secure function module or obtained from the server, and is used to obtain the secure transaction data. The transaction information is secure auxiliary data information or service data that is used in a transaction process, that is, service processing related data information, for example, security verification data or transaction settlement data.

With reference to the first possible implementation of the second aspect, in a third possible implementation of the second aspect, that the server obtains the first identifier and the third identifier according to the third transaction message, and performs a transaction check on the secure transaction data specifically includes:

The server obtains a secure transaction data requirement parameter and the third identifier, where the secure transaction data requirement parameter includes at least one of the following parameters: a secure transaction data length parameter or a secure transaction data encryption type parameter. The secure transaction data length parameter is used to indicate a required length of the secure transaction data provided by the secure function module. The secure transaction data encryption type parameter is used to indicate a type of the secure transaction data in the provided secure transaction data. It should be noted that, a method for obtaining the secure transaction data requirement parameter by the server includes: the third transaction message carries the secure transaction data requirement parameter, or the server and the transaction application module pre-agree upon the secure transaction data requirement parameter, or the server determines the secure transaction data requirement parameter according to a data feature of the secure transaction data (such as the length).

The server determines corresponding ninth secure processing data according to the secure transaction data requirement parameter and the third identifier, and performs the transaction check on the secure transaction data by using the ninth secure processing data. The first secure processing data is generated by the server in advance for the secure transaction data requirement parameter in the transaction terminal corresponding to the third identifier. If the ninth secure processing data is the same as the secure transaction data, the result of the transaction check is success; otherwise, the transaction check fails.

Alternatively, the server determines a corresponding seventh rule according to the secure transaction data requirement parameter and the third identifier, then obtains tenth secure processing data according to the seventh rule, and performs the check on the secure transaction data by using the tenth secure processing data. The seventh rule includes a fourth algorithm and a fourth numeric value, the seventh rule corresponds to a third rule of the secure function module in the transaction terminal, and the third rule includes a second algorithm and a second numeric value. Herein the correspondence between the seventh rule and the third rule indicates that the fourth algorithm is the same as the second algorithm, and that the fourth numeric value is the same as the second numeric value. The third rule is preset by the secure function module or obtained from the server, and is used to obtain the secure transaction data. Specifically, if the tenth secure processing data is the same as the secure transaction data, the result of the transaction check is success; otherwise, the result of the transaction check is failure.

Alternatively, the server determines a corresponding eighth rule according to the secure transaction data requirement parameter and the third identifier, and performs the transaction check on the secure transaction data according to the eighth rule. Specifically, the server processes the secure transaction data according to the eighth rule to obtain second data. If the second data includes transaction information satisfying a predetermined requirement (for example, content satisfies an agreed requirement and can be parsed successfully) and/or the second identifier, the result of the transaction check is success; otherwise, the result of the transaction check is failure. The eighth rule includes a fourth encryption algorithm and at least one fourth key, the eighth rule corresponds to a fourth rule of the secure function module in the transaction terminal, and the fourth rule includes a second encryption algorithm and at least one second key. Herein the correspondence between the eighth rule and the fourth rule indicates that the eighth rule may be used to perform decryption processing on data encrypted by the fourth rule to obtain unencrypted data. The fourth rule is preset by the secure function module or obtained from the server, and is used to obtain the secure transaction data. Herein the transaction information is secure auxiliary data information or service data in a transaction process, for example, security verification data or transaction settlement data.

According to a third aspect, a transaction information processing method is disclosed, and applied to a transaction terminal having a trusted execution environment TEE (Trusted Execution Environment), where the transaction terminal includes a secure function module and at least one transaction application module, the secure function module runs in the trusted execution environment, and the method includes the following steps:

The secure function module establishes a session connection to the transaction application module, and obtains a fourth identifier corresponding to the transaction application module, where the fourth identifier is used to identify the transaction application module or a virtual card currently used by the transaction application module. Herein the transaction application module runs in a rich execution environment (REE, Rich Execution Environment).

The secure function module obtains a first message sent by the transaction application module, where the first message includes transaction information.

The secure function module obtains a service key corresponding to the fourth identifier, and performs encryption processing on the transaction information by using a fifth algorithm and the service key, to obtain secure transaction data, where the fifth algorithm is an encryption algorithm, such as a 3DES algorithm or an AES algorithm, the fifth algorithm is agreed upon by the secure function module and a server, and the fifth algorithm may be preset by the secure function module or obtained from the server. It should be noted that, herein the correspondence between the service key and the fourth identifier indicates that the service key is used for processing the transaction information of the transaction application corresponding to the fourth identifier.

The secure function module sends the secure transaction data to the transaction application module, so that the transaction application module uses the secure transaction data to perform subsequent transaction processing.

In this way, by invoking the service key corresponding to the fourth identifier of the transaction application, the secure function module encrypts the transaction information provided by the transaction application module, to locally generate the secure transaction data used for a transaction, and does not need to obtain the secure transaction data online. The transaction is not affected by network conditions, and transaction efficiency is improved. In addition, there is no need to develop different secure function modules for every transaction application module, and therefore, industrial costs are reduced.

With reference to the third aspect, in a first possible implementation of the third aspect, before the secure function module receives the first message sent by the transaction application module, the method further includes:

The secure function module receives a second message sent by the transaction application module, where the second message is used to request generation of payment data, the second message is used to instruct the secure function module to obtain payment data corresponding to the transaction application module, and the payment data includes the service key.

The secure function module performs, by using a sixth algorithm, preset processing on account data corresponding to the transaction application module and a preset device key, to obtain a fifth key, and stores the fifth key in the trusted execution environment as the service key. The device key is an asymmetric key. For different transaction terminals, the device key varies. The sixth algorithm is a key derivation algorithm, such as a 3DES algorithm or an AES algorithm. It should be noted that, different fourth identifiers may correspond to different sixth algorithms. The account data is carried in the second message or obtained by the secure function module from the server. The account data may include a personal account number PAN (Personal Account Number) or a virtual account number. The virtual account number is generated by the server, and the virtual account number corresponds to only one PAN.

It should be noted that, the server also stores the device key. Therefore, the server may obtain the fifth key by using a same method correspondingly, and perform decryption processing on the secure transaction data. Therefore, the server does not need to configure the fifth key for the secure function module, and the secure function module also does not need to send the fifth key to the server after generating the fifth key, thereby avoiding a risk of leaking the fifth key in a transmission process. In addition, the secure function module may also obtain the fifth key without connecting to the Internet, and user experience is enhanced.

With reference to the third aspect, in a second possible implementation of the third aspect, that the secure function module obtains a service key corresponding to the fourth identifier specifically includes:

If the secure function module confirms that the service key does not exist, the secure function module processes third data by using a seventh algorithm, to obtain a sixth key, and stores the sixth key in the trusted execution environment, and the secure function module uses the sixth key as the service key, where the use threshold limit includes a use time threshold limit or a use quantity threshold limit, the seventh algorithm is a key derivation algorithm, the third data includes a seventh key, the seventh key is obtained by the secure function module from the server, the sixth key is subject to the use threshold limit, and the seventh key is subject to the use threshold limit; or if the secure function module confirms that the service key does not exist, the secure function module sends a key obtaining request to the server, and receives a response message from the server, where the response message includes an eighth key; and the secure function module obtains the eighth key in the response message, and updates or stores the eighth key in the trusted execution environment, where the use threshold limit includes a use time threshold limit or a use quantity threshold limit, and the eighth key is subject to the use threshold limit.

With reference to the third aspect, or the first or the second possible implementation of the third aspect, in a third possible implementation of the third aspect, the transaction terminal further includes a check module, and before the secure function module receives the first message sent by the transaction application module, the method further includes:

The check module performs a security check. Herein the security check method includes at least one of a password check or a biological feature check. The biological feature check includes at least one of a fingerprint check, an iris check, a voiceprint check, facial recognition, PPG recognition, or ECG recognition.

If the transaction terminal determines that a result of the security check is success, the transaction terminal sends the first message to the secure function module, or else, does not send the first message to the secure function module.

According to a fourth aspect, a transaction terminal is disclosed and includes:

a processor, configured to obtain secure transaction data according to a first transaction message, or the first transaction message and a second identifier, where the first transaction message includes a first identifier and/or a secure transaction data requirement parameter, the first identifier is used to identify a transaction application module of the transaction terminal or a virtual card currently used by the transaction application module, the second identifier is used to uniquely identify a secure function module of the transaction terminal, the secure function module runs in a trusted execution environment of the transaction terminal, and the secure transaction data requirement parameter includes at least one of the following parameters: a secure transaction data length parameter or a secure transaction data encryption type parameter, where the secure transaction data length parameter is used to indicate a required length of the secure transaction data provided by the secure function module, and the secure transaction data encryption type parameter is used to indicate an encryption type of the secure transaction data in the provided secure transaction data, for example, encryption or not, or a type of a used encryption algorithm (for example, a symmetric encryption algorithm or an asymmetric encryption algorithm), or a type of a used encryption algorithm (for example, a 3DES algorithm or an AES algorithm), or the like; and a transmitter, configured to send a second transaction message to an acquiring terminal, where the second transaction message includes the secure transaction data, the first identifier, and a third identifier, and the third identifier is used to identify the transaction terminal.

With reference to the fourth aspect, in a first possible implementation of the fourth aspect, the processor is specifically configured to: use one of at least one piece of first secure processing data corresponding to the first identifier as the secure transaction data, where the first secure processing data is generated by a server for the first identifier in the transaction terminal, and the first secure processing data is obtained from the server in advance and stored in the trusted execution environment; or obtain second secure processing data according to a first rule corresponding to the first identifier, and use the second secure processing data as the secure transaction data, where the first rule is preset or obtained from the server, and the first rule includes a first algorithm and a first numeric value; or obtain third secure processing data by encrypting first data according to a second rule corresponding to the first identifier, and use the third secure processing data as the secure transaction data, where the second rule is preset by the secure function module or obtained from the server, the second rule includes a first encryption algorithm and at least one first key, the first data includes the transaction information and/or the second identifier, the transaction information is sent by the transaction application module to the secure function module, and the transaction information is secure auxiliary data information or service data in a transaction process; for example, the transaction information includes fee deduction information (for example, an authorized amount or a terminal verification result) received by the transaction application module from a POS and virtual card information stored by the transaction application module, where the virtual card information includes a transaction counter, an application interaction feature, and the like.

With reference to the fourth aspect, in a second possible implementation of the fourth aspect, the processor is specifically configured to: use one of at least one piece of fourth secure processing data corresponding to the secure transaction data requirement parameter as the secure transaction data, where the at least one piece of fourth secure processing data is generated by a server according to the secure transaction data requirement parameter, obtained from the server in advance, and stored in the trusted execution environment; or generate fifth secure processing data according to a third rule corresponding to the secure transaction data requirement parameter, and use the fifth secure processing data as the secure transaction data, where the third rule is preset or obtained from the server, and the first rule includes a second algorithm and a second numeric value; or obtain sixth secure processing data by encrypting second data according to a fourth rule corresponding to the secure transaction data requirement parameter, and use the sixth secure processing data as the secure transaction data, where the fourth rule is preset or obtained from the server, the fourth rule includes a second encryption algorithm and at least one second key, the second data includes the transaction information and/or the second identifier, and the transaction information is secure auxiliary data information or service processing related data information that is used in a transaction process; for example, the transaction information includes fee deduction information (for example, an authorized amount or a terminal verification result) received by the transaction application module from a POS and virtual card information stored by the transaction application module, where the virtual card information includes a transaction counter, an application interaction feature, and the like.

With reference to the fourth aspect, in a third possible implementation of the fourth aspect, the transmitter is further configured to submit a registration request message to the server, where the registration request message includes the first identifier, a transaction account corresponding to the transaction application module, and the third identifier, so that the server stores the first identifier, transaction account information corresponding to the transaction application module, and the third identifier.

It should be noted that, the third identifier uniquely corresponds to the second identifier on the server.

With reference to the fourth aspect, in a fourth possible implementation of the fourth aspect, the processor is further configured to: before obtaining the secure transaction data according to the first transaction message, or the first transaction message and the second identifier, perform a security check, and determine that a result of the security check is success.

With reference to the fourth possible implementation of the fourth aspect, in a fifth possible implementation of the fourth aspect, the processor is further configured to: before performing the security check, generate the first transaction message, and determine, according to the first transaction message, that the security check needs to be performed.

Specifically, the first transaction message includes the first identifier and/or the secure transaction data requirement parameter, and it is determined, according to the first identifier and/or the secure transaction data requirement parameter, that the security check needs to be performed.

According to a fifth aspect, a server is disclosed and includes:

a receiver, configured to receive a third transaction message from an acquiring terminal, where the third transaction message includes secure transaction data, a first identifier, and a third identifier, the secure transaction data is generated by a secure function module of a transaction terminal, the first identifier is used to identify a transaction application module in the transaction terminal or a virtual card currently used by the transaction application module, and the third identifier is used to identify the transaction terminal; and a processor, configured to obtain the first identifier and the third identifier according to the third transaction message, and perform a transaction check on the secure transaction data; where the processor is further configured to: if determining that a result of the transaction check is success, determine a corresponding transaction account according to the first identifier and the third identifier, and perform transaction processing on the transaction account.

With reference to the fifth aspect, in a first possible implementation of the fifth aspect, the receiver is further configured to receive, before receiving the third transaction message from the acquiring terminal, registration request information sent by the transaction terminal, where the registration request information includes the first identifier, the transaction account corresponding to the transaction application module, and the third identifier; and the processor is configured to store the first identifier, the transaction account, and the third identifier; where the third identifier uniquely corresponds to a second identifier on the server, and the second identifier is used to identify the secure function module of the transaction terminal.

With reference to the first possible implementation of the fifth aspect, in a second possible implementation of the fifth aspect, the processor is specifically configured to: determine corresponding seventh secure processing data according to the first identifier and the third identifier, and perform the transaction check on the secure transaction data by using the seventh secure processing data; and if the seventh secure processing data is the same as the secure transaction data, determine that the transaction check succeeds; otherwise, determine that the transaction check fails; where the seventh secure processing data is generated by the server in advance for the first identifier in the transaction terminal corresponding to the third identifier; or determine a corresponding fifth rule according to the first identifier and the third identifier, then obtain eighth secure processing data according to the fifth rule, and perform the transaction check on the secure transaction data by using the eighth secure processing data; and if the eighth secure processing data is the same as the secure transaction data, determine that the transaction check succeeds; otherwise, determine that the transaction check fails; where the fifth rule includes a third algorithm and a third numeric value, the fifth rule corresponds to a first rule of the secure function module, and the first rule includes a first algorithm and a first numeric value; or determine a corresponding sixth rule according to the first identifier and the third identifier, and perform the check on the secure transaction data according to the sixth rule. Specifically, the server processes the secure transaction data according to the sixth rule to obtain first data; if the first data includes transaction information satisfying a predetermined requirement (for example, content satisfies an agreed requirement and can be parsed successfully) and/or the second identifier, the check succeeds; otherwise, the check fails. The sixth rule includes a third encryption algorithm and at least one third key, the sixth rule corresponds to a second rule of the secure function module in the transaction terminal, and the second rule includes a first encryption algorithm and at least one first key. Herein the correspondence between the sixth rule and the second rule indicates that the sixth rule may be used to perform decryption processing on data encrypted by the second rule to obtain unencrypted data. The second rule is preset by the secure function module or obtained from the server, and is used to obtain the secure transaction data. The transaction information is secure auxiliary data information or service processing related data information that is used in a transaction process, for example, security verification data or transaction settlement data.

With reference to the first possible implementation of the fifth aspect, in a third possible implementation of the fifth aspect, the processor is specifically configured to: obtain a secure transaction data requirement parameter and the third identifier, where the secure transaction data requirement parameter includes at least one of the following parameters: a secure transaction data length parameter or a secure transaction data encryption type parameter, where the secure transaction data length parameter is used to indicate a required length of the provided secure transaction data, and the secure transaction data encryption type parameter is used to indicate a type of the secure transaction data provided by the secure function module; and determine corresponding third secure processing data according to the secure transaction data requirement parameter and the third identifier, and perform the transaction check on the secure transaction data by using the third secure processing data; and if the third secure processing data is the same as the secure transaction data, determine that the transaction check succeeds; otherwise, determine that the transaction check fails; where the third secure processing data is generated by the server in advance for the first identifier corresponding to the secure transaction data requirement parameter in the transaction terminal; or determine a corresponding seventh rule according to the secure transaction data requirement parameter and the third identifier, then obtain tenth secure processing data according to the seventh rule, and perform the transaction check on the secure transaction data by using the tenth secure processing data; and if the tenth secure processing data is the same as the secure transaction data, determine that the transaction check succeeds; otherwise, determine that the transaction check fails; where the seventh rule includes a fourth algorithm and a fourth numeric value, the seventh rule corresponds to a third rule of the secure function module, and the third rule includes a second algorithm and a second numeric value; or determine a corresponding eighth rule according to the secure transaction data requirement parameter and the third identifier, and perform the transaction check on the secure transaction data according to the eighth rule. Specifically, the server processes the secure transaction data according to the eighth rule to obtain second data; and if the second data includes transaction information satisfying a predetermined requirement (for example, content satisfies an agreed requirement and can be parsed successfully) and/or the second identifier, the result of the transaction check is success; otherwise, the result of the transaction check is failure. The eighth rule includes a fourth encryption algorithm and at least one fourth key, the eighth rule corresponds to a fourth rule of the secure function module in the transaction terminal, and the fourth rule includes a second encryption algorithm and at least one second key. Herein the correspondence between the eighth rule and the fourth rule indicates that the eighth rule may be used to perform decryption processing on data encrypted by the fourth rule to obtain unencrypted data. The fourth rule is preset by the secure function module or obtained from the server, and is used to obtain the secure transaction data. Herein the transaction information is secure auxiliary data information or service processing related data information that is used in a transaction process, for example, security verification data or transaction settlement data.

According to a sixth aspect, a transaction terminal is disclosed and includes:

a processor, configured to obtain a fourth identifier, where the fourth identifier is used to identify a transaction application module in the transaction terminal, or the fourth identifier is used to identify a virtual card currently used by the transaction application module; and obtain a first message, where the first message includes transaction information; where the processor is further configured to obtain a service key corresponding to the fourth identifier, and perform encryption processing on the transaction information by using a fifth algorithm and the service key, to obtain secure transaction data.

With reference to the sixth aspect, in a first possible implementation of the sixth aspect, the processor is further configured to: before obtaining the first transaction message, obtain a second message, where the second message is used to request generation of payment data; and perform, by using a sixth algorithm, preset processing on account data and a preset device key, to obtain a fifth key, and store the fifth key in the trusted execution environment as the service key, where the sixth algorithm is a key derivation algorithm, and the account data is carried in the second message or obtained by the secure function module from a server.

With reference to the sixth aspect, in a second possible implementation of the sixth aspect, the transaction terminal further includes a transmitter and a receiver, where the transmitter is specifically configured to send a key obtaining request to the server;

the receiver is configured to receive a response message from the server, where the response message includes an eighth key; and the processor is configured to: if confirming that the service key exists and exceeds a use threshold limit, obtain the eighth key in the response message, update the service key to the eighth key, and store the service key in the trusted execution environment, where the use threshold limit includes a use time threshold limit or a use quantity threshold limit, and the eighth key is subject to the use threshold limit; or the processor is further configured to: if confirming that the service key exists and exceeds a use threshold limit, process third data by using an eighth algorithm, to obtain a sixth key, update the service key to the sixth key, and store the service key in the trusted execution environment, where the use threshold limit includes a use time threshold limit or a use quantity threshold limit, the eighth algorithm is a key derivation algorithm, the third data includes a seventh key, the seventh key is obtained by the secure function module from the server, the sixth key is subject to the use threshold limit, and the seventh key is subject to the use threshold limit.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
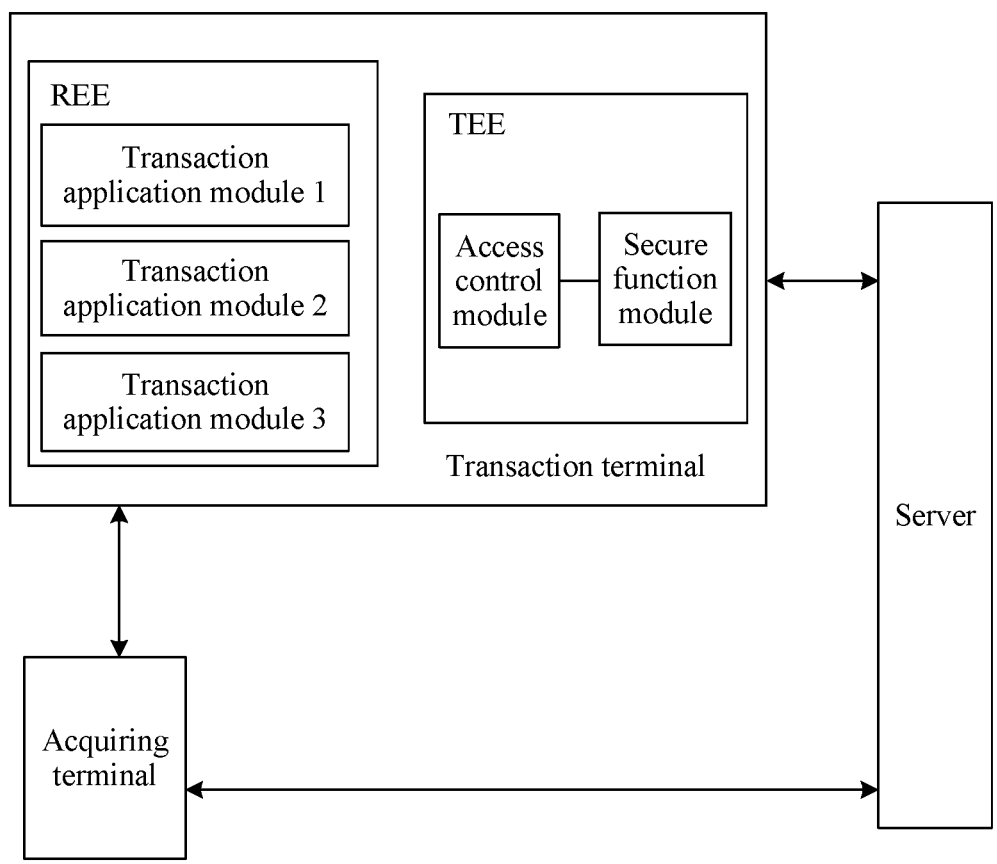
FIG. 1 is a schematic diagram of a transaction system according to an embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Security protection for user privacy data in a mobile transaction service attracts more attention in the industry. For example, a mobile payment service relates to financial security of a user account, and has a very high requirement for data security. Currently, mainstream security technologies in the industry include SE, TEE, and HCE.

An SE (Secure Element) is a microcontroller that has a content anti-tampering function. The SE can provide a secure storage and running environment for an application installed in the SE. As a secure carrier for mobile payment, the SE not only securely stores and calculates critical data in a transaction to ensure security authentication and nonrepudiation of the ongoing sensitive transaction, but also supports multi-application dynamic management and running security. In the terminal field, common SE forms include a UICC (Universal Integrated Circuit Card, universal integrated circuit card) SE and an eSE (embedded SE, namely, an SE embedded in a main board of a terminal), and the like.

A trusted execution environment (Trusted Execution Environment, TEE) coexists with an REE in a running environment of an intelligent terminal. Based on hardware support, the TEE has a security capability, and can satisfy a security requirement and implement a running mechanism isolated from the REE. The TEE has its running space, and a strict protection measure is defined for the TEE. Therefore, the TEE has a higher security level than the REE. Only authorized secure software can be installed and run in the TEE. Data, software, and the like in the TEE can be protected from being attacked, and a security threat of a specific type can be resisted. Therefore, confidentiality of resources and data of secure software is protected. Therefore, compared with the REE, the TEE can protect security of data and resources better.

Usually, before an application (App) is written or modified in the TEE or SE, authorization of a corresponding TEE or SE control-end TSM (Trusted Service Manager, trusted service manager) is required, and there is an adaptation requirement in application development. Therefore, on the whole, although the TEE or the SE has relatively high security, industry chain costs are also relatively high.

An HCE application can perform communication by using an NFC interface of the terminal and a POS terminal or a card reading device such as a card reader. However, because protection of data stored in the REE is not enough to resist threats from various types of malicious software, when the HCE application stores confidential data such as a related user account in the REE, the confidential data is easily stolen. Therefore, the related data of the HCE program in the REE is in a relatively risky state.

Therefore, critical data of the HCE application is usually stored on a server, and when a transaction needs to be performed, the terminal communicates with the server to obtain secure transaction data such as a transaction token (Token) or encrypted transaction information. Therefore, the terminal needs to connect to the Internet, and can complete the transaction only depending on the server. It should be noted that, the token can be considered as substitute code data of the user account, and can be recognized by the server, but is not a real account.

Based on this, a principle of the present invention is as follows: A common secure function module is provided in a TEE; and during a transaction, the secure function module is used to provide processing of secure transaction data for one or a plurality of transaction application modules (such as a client application CA (Client Application) of an HCE application), that is, there is no need to develop and install a corresponding secure function module for every transaction application module. For example, the secure function module can perform a transaction by providing a corresponding token, or locally encrypting transaction information, or the like according to a feature (such as an identifier of a transaction application) or a requirement (such as a requirement for a length of secure transaction data and/or an encryption processing method) of the transaction application. This can ensure security of the transaction, guarantee user account security, avoid obtaining the token online during the transaction, and improve transaction efficiency. In addition, there is no need to develop different secure function modules for every transaction application module, and therefore, industrial costs are reduced.

First, an embodiment of the present invention provides a transaction system. As shown in FIG. 1, the transaction system includes a transaction terminal, an acquiring terminal, and a server.

The transaction terminal includes a TEE and an REE, and a plurality of transaction application modules (such as a CA of an HCE application) run in the REE. The TEE includes an access control module and a secure function module. The secure function module is configured to obtain secure transaction data locally in the transaction terminal. The acquiring terminal may be an acquiring POS terminal. The server is a server corresponding to a transaction application module. For example, if an APP 1 is a transaction application of ICBC, the server may be a server such as an ICBC server or a Unionpay server that can provide transaction processing for the transaction application of ICBC.

In addition, the transaction system is applicable to a transaction such as making payment, redeeming points of a membership card, or using a movie ticket.

Embodiment 1

Figure 2:
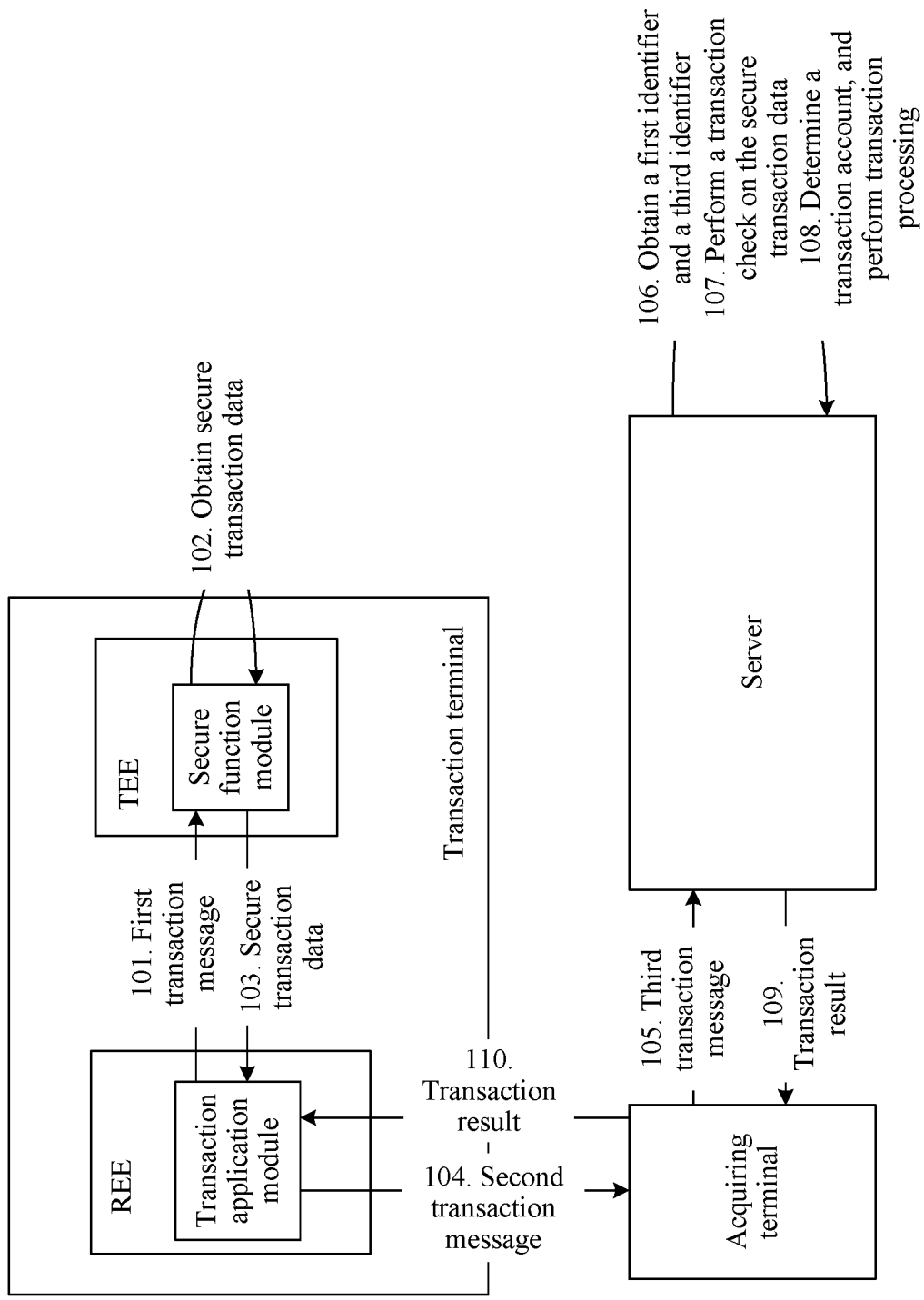
FIG. 2 is a schematic flowchart of a transaction method according to an embodiment of the invention.

This embodiment of the present invention provides a transaction method. As shown in FIG. 2, the method includes the following steps:

101. A secure function module receives a first transaction message sent by a transaction application module.

Herein the transaction application module is any one of at least one transaction application module included in a transaction terminal, and the secure function module runs in a trusted execution environment, namely, the TEE environment, in the transaction terminal. In addition, the first transaction message includes a first identifier and/or a secure transaction data requirement parameter, and the first identifier is used to identify the transaction application module or a virtual card currently used by the transaction application module. The virtual card is a software entity that has no physical medium and can be loaded to a host card emulation application and interact with a POS by using a communications link provided by the terminal, to complete payment. The virtual card may be generated depending on a physical card issued by a bank, or may be a virtual card that is issued by a bank and has no physical medium.

For example, the first identifier may be an AID of the virtual card loaded by the transaction application module and/or a certificate of the transaction application module and a digital signature. For example, the first identifier is an AID (Application Identifier, application identifier), the AID is defined in an ISO 7816-4 standard, and the AID includes two parts: RID (Registered application provider identifier, registered application provider identifier)+PIX (Proprietary application identifier extension, proprietary application identifier extension information).

The secure transaction data requirement parameter includes at least one of the following parameters: a secure transaction data length parameter or a secure transaction data encryption type parameter. The secure transaction data length parameter is used to indicate a required length of secure transaction data provided by the secure function module. The secure transaction data encryption type parameter is used to indicate an encryption type of the secure transaction data in the provided secure transaction data, for example, encryption or not, or a type of a used encryption algorithm (for example, a symmetric encryption algorithm or an asymmetric encryption algorithm), or a type of a used encryption algorithm (for example, an AES (Advanced Encryption Standard) algorithm, or a 3DES (Triple Data Encryption Algorithm) algorithm), or the like.

Therefore, the secure transaction data provided by the secure function module is definitely required by the transaction application module for performing the transaction, and further, the transaction terminal can perform the transaction without obtaining the secure transaction data online.

In a specific implementation, the transaction terminal may further perform a security check before step 101. Herein the security check method includes at least one of a password check or a biological feature check. The biological feature check includes at least one of a fingerprint check, an iris check, a voiceprint check, facial recognition, PPG recognition, or ECG recognition. When determining that a result of the security check is success, the transaction terminal sends the first transaction message to the secure function module, that is, step 101 is performed. Otherwise, the transaction application module does not send the first transaction message to the secure function module.

102. The secure function module obtains secure transaction data locally.

In a specific implementation, the secure function module obtains the secure transaction data according to the first transaction message, or the first transaction message and a second identifier. For example, the secure function module may obtain, according to the first transaction message, the secure transaction data prestored in the TEE of the terminal, or may obtain the secure transaction data through calculation by using an encryption algorithm, or may obtain the secure transaction data through calculation according to the first transaction message, or the first transaction message and the second identifier by using a specific rule.

It should be noted that, herein the second identifier is used to identify the secure function module, for example, may be an identifier allocated by a server to the secure function module. Herein the secure transaction data is data that can be used during the transaction to enhance security, for example, a transaction token, or transaction information after encryption processing.

103. The secure function module sends the obtained secure transaction data to the transaction application module.

104. The transaction application module sends a second transaction message to an acquiring terminal.

The second transaction message includes the secure transaction data, the first identifier, and the third identifier, where the third identifier is used to identify the transaction terminal.

That is, the transaction application module receives the secure transaction data sent by the secure function module, and generates the second transaction message according to the secure transaction data. In addition, the second transaction message may further include other information about the transaction, such as a transaction amount.

It should be noted that, the first identifier included in the second transaction message may be independent of the secure transaction data, that is, existent in parallel with the secure transaction data in the second transaction message, or may be included in the secure transaction data, that is, used as a part of the secure transaction data.

105. The acquiring terminal forwards a third transaction message to a server for transaction processing.

The third transaction message is the second transaction message or is generated by the acquiring terminal according to the second transaction message, and the third transaction message includes the secure transaction data, the first identifier, and the third identifier.

In addition, the first identifier included in the third transaction message may be independent of the secure transaction data, that is, existent in parallel with the secure transaction data in the third transaction message, or may be included in the secure transaction data, that is, used as a part of the secure transaction data.

106. The server receives the third transaction message, and obtains the first identifier and the third identifier according to the third transaction message.

107. The server performs a transaction check on the secure transaction data, and determines that a result of the transaction check is success.

In a specific implementation, corresponding to manners of obtaining the secure transaction data by the secure function module of the transaction terminal, the server has different check methods. For example, the secure function module obtains, according to the first transaction message, the secure transaction data stored in the TEE of the transaction terminal, and the server also prestores the same secure transaction data. When the server receives the secure transaction data from the transaction terminal, the server obtains the corresponding secure transaction data stored on the server side and makes a comparison to complete the transaction check.

Alternatively, the secure function module of the transaction terminal obtains the secure transaction data by using a specific rule, for example, generates the secure transaction data by using a specific rule, or obtains the transaction data by encrypting transaction information by using a specific rule. The server performs the transaction check by using a rule corresponding to the specific rule.

108. The server determines a transaction account according to the first identifier and the third identifier, and performs transaction processing on the transaction account.

It should be noted that, before step 106, the server receives registration request information sent by the transaction application module, where the registration request information includes the first identifier, transaction account information corresponding to the transaction application module, and the third identifier. Further, the server stores the first identifier, the transaction account information corresponding to the transaction application module, and the third identifier. The server can uniquely determine, according to the first identifier and the third identifier, the transaction account information corresponding to the transaction application module. The transaction account information includes a personal account number PAN (Personal Account Number).

It should be noted that, a great difference exists between the first identifier and the second identifier in this embodiment of the present invention. Specifically, the first identifier indicates a type of a transaction application, and transaction applications having a same first identifier may exist on different transaction terminals. The second identifier identifies a specific secure function module in a specific transaction terminal, that is, at one time, the second identifier exists on only one transaction terminal, and does not appear on another transaction terminal.

109. The server performs transaction processing, and sends a transaction result to the acquiring terminal.

It should be noted that, herein the server includes a token server (for example, the token server is responsible for verifying the secure transaction data, and obtaining the transaction account information according to the secure transaction data) and/or a transaction server (for example, the transaction server is responsible for transaction processing). In a specific implementation, one server may be used as both a token server and a transaction server, or different servers are used as a token server and a transaction server respectively.

110. Optionally, the acquiring terminal forwards the transaction result to the transaction terminal.

In a preferred embodiment of the present invention, the secure function module of the transaction terminal may obtain the secure transaction data locally in the transaction terminal in the following six manners, including:

Manner 1: The secure function module uses one of at least one piece of first secure processing data corresponding to the first identifier as the secure transaction data.

The first secure processing data is generated by the server for the first identifier in the transaction terminal, that is, can be used only as the secure transaction data of the transaction application corresponding to the first identifier in the transaction terminal, and cannot be used as secure transaction data of another transaction application. The first secure processing data is obtained by the secure function module from the server in advance and stored in the trusted execution environment.

Manner 2: The secure function module obtains second secure processing data according to a first rule corresponding to the first identifier, and uses the second secure processing data as the secure transaction data.

The first rule is preset by the secure function module or obtained from the server, and the first rule includes a first algorithm (such as a hash algorithm) and a first numeric value (such as a character string or a numeral).

For example, the secure function module prestores a numeric value A (such as a numeral or a character string) and a same algorithm B (such as a hash function); when receiving the first transaction message, the secure function module obtains the secure transaction data by calculating (the numeric value A plus a current time) by using the algorithm B.

It should be noted that, the secure function module may further form the secure transaction data according to the first identifier and the second secure processing data. For example, the first identifier is an AID 12345678, where an RID part is 1234; the second secure processing data is abcdefgh; in this case, the token (secure transaction data) may also be 1234abcdefgh, or 12348765abcdefgh.

Manner 3: The secure function module may further obtain third secure processing data by encrypting first data according to a second rule corresponding to the first identifier, and use the third secure processing data as the secure transaction data.

Herein the first data includes the transaction information and/or the second identifier. The transaction information is obtained by the secure function module from the transaction application module, and the transaction information is secure auxiliary data information or service processing related data information that is used in a transaction process, for example, security verification data or transaction settlement data.

It should be noted that, the second rule is preset by the secure function module or obtained from the server, and the second rule includes a first encryption algorithm and at least one first key. Herein the first encryption algorithm may be a symmetric encryption algorithm or an asymmetric encryption algorithm.

Manner 4: The secure function module uses one of at least one piece of fourth secure processing data corresponding to the secure transaction data requirement parameter as the secure transaction data.

Herein the secure transaction data requirement parameter is the secure transaction data length parameter and/or the secure transaction data encryption type parameter carried in the first transaction message. The at least one piece of fourth secure processing data complies with all the secure transaction data requirement parameters carried in the first transaction message. The at least one piece of fourth secure processing data is generated by the server according to the secure transaction data requirement parameter, and obtained by the secure function module from the server in advance and stored in the trusted execution environment.

Manner 5: The secure function module generates fifth secure processing data according to a third rule corresponding to the secure transaction data requirement parameter, and uses the fifth secure processing data as the secure transaction data.

The third rule is preset by the secure function module or obtained from the server, and the third rule includes a second algorithm (such as a hash algorithm) and a second numeric value (such as a character string or a numeral).

Specifically, the secure function module performs algorithm processing on the second numeric value by using the second algorithm, to obtain the secure transaction data.

Manner 6: The secure function module obtains sixth secure processing data by encrypting second data according to a fourth rule corresponding to the secure transaction data requirement parameter, and uses the sixth secure processing data as the secure transaction data.

Herein the second data includes the transaction information and/or the second identifier, and the transaction information is obtained by the secure function module from the transaction application module. The fourth rule is preset by the secure function module or obtained from the server, the fourth rule includes a second encryption algorithm and at least one second key, and the second encryption algorithm may be a symmetric encryption algorithm or an asymmetric encryption algorithm.

Corresponding to the six manners of obtaining the secure transaction data by the secure function module of the transaction terminal, the following six manners may also be used by the server in step 107 to perform the transaction check on the secure transaction data, and determine the result of the transaction check, specifically including:

Manner 1: The server determines the corresponding first secure processing data according to the first identifier and the third identifier, and performs the transaction check on the secure transaction data by using the first secure processing data.

The first secure processing data is generated by the server in advance for the first identifier in the transaction terminal corresponding to the third identifier.

Specifically, if the first secure processing data is the same as the secure transaction data, the result of the transaction check is success; otherwise, the transaction check fails.

Manner 2: The server determines a corresponding fifth rule according to the first identifier and the third identifier, obtains the second secure processing data according to the fifth rule, and performs the check on the secure transaction data by using the second secure processing data.

Specifically, if the second secure processing data is the same as the secure transaction data, the result of the transaction check is success; otherwise, the transaction check fails.

It should be noted that, the fifth rule includes a third algorithm and a third numeric value, the fifth rule corresponds to the first rule of the secure function module of the transaction terminal, and the first rule includes the first algorithm and the first numeric value. Herein the correspondence between the fifth rule and the first rule indicates that the third algorithm is the same as the first algorithm, and that the third numeric value is the same as the first numeric value.

For example, the fifth rule corresponds to the first rule, that is, the same rule is stored in the secure function module and the server, and includes the same numeric value A (such as a numeral or a character string) and the same algorithm B (such as a hash function), and on the server, the fifth rule is associated with the first identifier of the secure function module.

When receiving the first transaction message, the secure function module obtains the secure transaction data by calculating the numeric value A plus the current time by using the algorithm B, and sends the secure transaction data to the server. After receiving the secure transaction data, the server obtains the first identifier (which may be a part of the secure transaction data or may be carried in the second transaction message). Likewise, the data obtained by calculating the numeric value A plus the current time by using the algorithm B is the same as the secure transaction data obtained by the transaction terminal, and a comparison is made between the obtained data and the received secure transaction data to implement verification.

Manner 3: The server determines a corresponding sixth rule according to the first identifier and the third identifier, processes the secure transaction data according to the sixth rule to obtain the first data, and performs the transaction check on the first data.

The sixth rule includes a third encryption algorithm and at least one third key, the sixth rule corresponds to the second rule of the secure function module in the transaction terminal, and the second rule includes the first encryption algorithm and the at least one first key. Herein the correspondence between the sixth rule and the second rule indicates that the sixth rule may be used to perform decryption processing on data encrypted by the second rule to obtain unencrypted data. The second rule is preset by the secure function module or obtained from the server, and is used to obtain the secure transaction data.

Specifically, if the first data includes transaction information satisfying a predetermined requirement (for example, content satisfies an agreed requirement and can be parsed successfully) and/or the second identifier, the check succeeds; otherwise, the check fails. The transaction information is the secure auxiliary data information or the service processing related data information that is used in the transaction process, for example, the security verification data or the transaction settlement data.

Manner 4: The server obtains the secure transaction data requirement parameter and the third identifier, determines the corresponding third secure processing data, and performs the transaction check on the secure transaction data by using the third secure processing data. The first secure processing data is generated by the server in advance for the secure transaction data requirement parameter in the transaction terminal corresponding to the third identifier. If the third secure processing data is the same as the secure transaction data, the result of the transaction check is success; otherwise, the transaction check fails.

The secure transaction data requirement parameter includes at least one of the following parameters: the secure transaction data length parameter or the secure transaction data encryption type parameter. The secure transaction data length parameter is used to indicate the required length of the secure transaction data provided by the secure function module. The secure transaction data encryption type parameter is used to indicate the type of the secure transaction data in the provided secure transaction data. It should be noted that, a method for obtaining the secure transaction data requirement parameter by the server includes: the third transaction message carries the secure transaction data requirement parameter, or the server and the transaction application module pre-agree upon the secure transaction data requirement parameter, or the server infers the secure transaction data requirement parameter according to a data feature of the secure transaction data (such as the length).

Manner 5: The server determines a corresponding seventh rule according to the secure transaction data requirement parameter and the third identifier, then obtains tenth secure processing data according to the seventh rule, and performs the check on the secure transaction data by using the tenth secure processing data.

Specifically, if the fourth secure processing data is the same as the secure transaction data, the result of the transaction check is success; otherwise, the result of the transaction check is failure.

It should be noted that, the seventh rule includes a fourth algorithm and a fourth numeric value, the seventh rule corresponds to the third rule of the secure function module in the transaction terminal, and the third rule includes the second algorithm and the second numeric value. Herein the correspondence between the seventh rule and the third rule indicates that the fourth algorithm is the same as the second algorithm, and that the fourth numeric value is the same as the second numeric value. The third rule is preset by the secure function module or obtained from the server, and is used to obtain the secure transaction data.

Manner 6: The server determines a corresponding eighth rule according to the secure transaction data requirement parameter and the third identifier, and processes the secure transaction data according to the eighth rule to obtain the second data. If the second data includes transaction information satisfying a predetermined requirement (for example, content satisfies an agreed requirement and can be parsed successfully) and/or the second identifier, the result of the transaction check succeeds; otherwise, the result of the transaction check is failure.

It should be noted that, the eighth rule includes a fourth encryption algorithm and at least one fourth key, the eighth rule corresponds to the fourth rule of the secure function module in the transaction terminal, and the fourth rule includes the second encryption algorithm and the at least one second key. Herein the correspondence between the eighth rule and the fourth rule indicates that the eighth rule may be used to perform decryption processing on data encrypted by the fourth rule to obtain unencrypted data. The fourth rule is preset by the secure function module or obtained from the server, and is used to obtain the secure transaction data. Herein the transaction information is obtained by the secure function module from the transaction application module, and is the secure auxiliary data information or the service processing related data information that is used in the transaction process, for example, the security verification data or the transaction settlement data.

It should be noted that, in the foregoing six manners of performing security verification on the secure transaction data, because the second identifier uniquely corresponds to the third identifier on the server, the server may also first determine the second identifier according to the third identifier, and then replace the third identifier with the second identifier to perform the foregoing processing.

In another preferred embodiment of the present invention, before the secure function module receives the first transaction message sent by the transaction application module, the method further includes:

The transaction application module submits a registration request message to the server, where the registration request message includes the first identifier, transaction account information corresponding to the transaction application module, and the third identifier, and the third identifier is used to identify the transaction terminal, so that the server records a correspondence between the first identifier, the transaction account information corresponding to the transaction application module, and the third identifier. Therefore, the server can uniquely determine, according to the first identifier and the third identifier, the transaction account information corresponding to the transaction application module.

In another preferred embodiment of the present invention, before the secure function module receives the first transaction message sent by the transaction application module, the method further includes:

A check module of the transaction terminal performs a security check. Herein the security check method includes at least one of a password check or a biological feature check. The biological feature check includes at least one of a fingerprint check, an iris check, a voiceprint check, facial recognition, PPG recognition, or ECG recognition.

If the transaction terminal determines that a result of the security check is success, the transaction terminal sends the first transaction message to the secure function module, or else, does not send the first transaction message to the secure function module.

Further, before the check module of the transaction terminal performs the security check, the method further includes:

The transaction application module generates the first transaction message, and determines, according to the first transaction message, that the security check needs to be performed. Specifically, the first transaction message includes the first identifier, or the first identifier and the secure transaction data requirement parameter. The check module of the transaction terminal determines, according to the first identifier and/or the secure transaction data requirement parameter, that the security check needs to be performed.

In the transaction method provided by this embodiment of the present invention, the secure function module of the transaction terminal receives the first transaction message sent by the transaction application module, obtains the secure transaction data locally from the transaction terminal according to the first transaction message, and sends the secure transaction data to the transaction application module, so that the secure transaction data is submitted to the server for determining the transaction account and performing corresponding transaction processing. In the prior art, during a transaction in HCE, secure transaction data must be obtained online, and the transaction is limited by network conditions. When the network conditions are relatively poor, the secure transaction data cannot be obtained, and further, the transaction cannot be performed, and transaction efficiency is relatively low. In contrast, in the method provided by the present invention, the secure transaction data does not need to be obtained online during the transaction, and the transaction can be performed according to the locally obtained secure transaction data. Therefore, the transaction is not limited by the network conditions, and transaction efficiency is improved, while transaction security is ensured.

Embodiment 2

Figure 3:
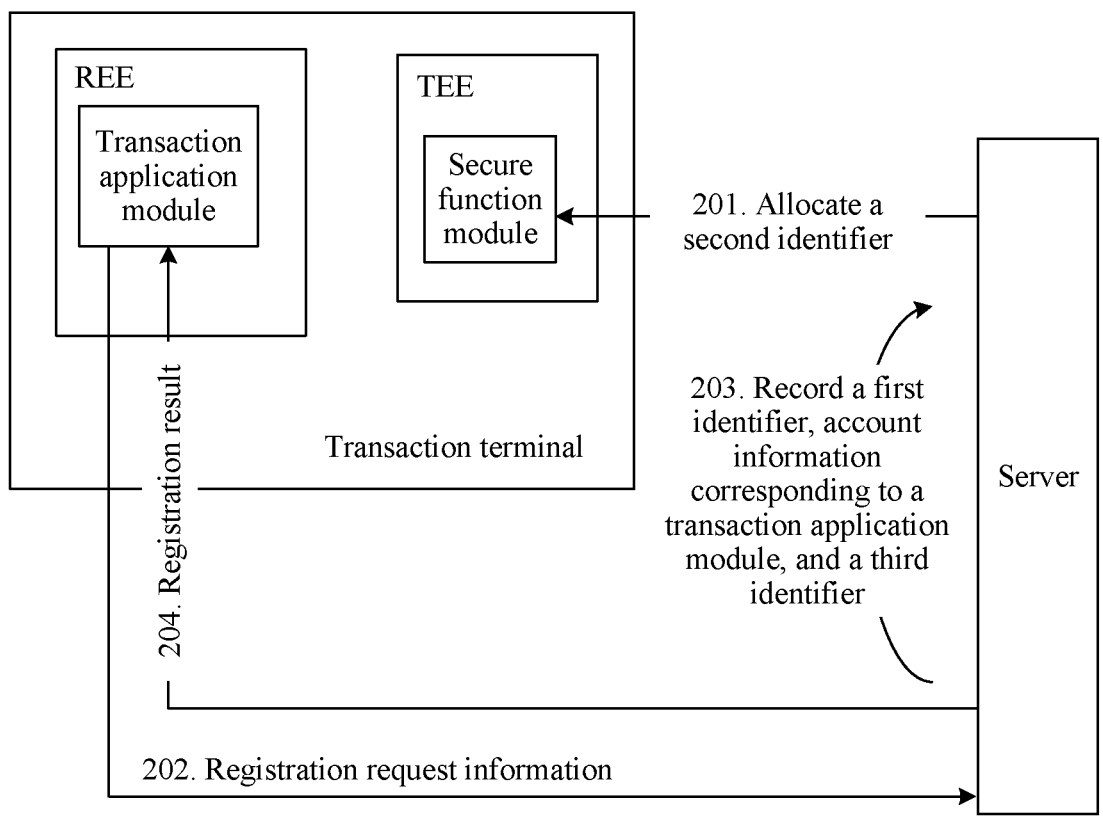
FIG. 3 is a schematic method diagram of a registration process according to an embodiment of the invention.

To perform transaction processing by using a method provided by the present invention, a transaction application module of a transaction terminal further needs to complete registration in advance by using a secure function module, so as to ensure transaction security. As shown in FIG. 3, a registration process of the secure function module includes the following steps:

201. A server allocates a second identifier to a secure function module.

The second identifier is used to identify the secure function module of the transaction terminal. In a specific implementation, the server allocates a piece of identifier information to each secure function module, but identifier information of each secure function module is different. For example, the second identifier uniquely identifies the secure function module of the transaction terminal.

In addition, the server may further obtain identifier information of the transaction terminal, and maintain a correspondence between the identifier information of the secure function module and the identifier information of the transaction terminal, that is, record a correspondence between the second identifier and a third identifier (namely, identifier information of the transaction terminal).

202. The server receives registration request information sent by the transaction application module.

The registration request information includes a first identifier, transaction account information corresponding to the transaction application module, and the third identifier. The first identifier identifies the transaction application module, and the third identifier is used to identify the transaction terminal.

It should be noted that, because the third identifier uniquely corresponds to the second identifier on the server, the third identifier in the registration request information may also be replaced with the second identifier.

203. The server records the first identifier, transaction account information corresponding to the transaction application module, and the third identifier.

For example, the server records an account ID (the transaction account information), an APP ID (the first identifier, namely, identifier information of a transaction application), and a device ID (the third identifier, namely, the identifier information of the transaction terminal). In addition, the server can uniquely determine corresponding account ID information according to the device ID and the APP ID.

204. The server returns a configuration result to the transaction application module.

For example, an OK message is returned to the transaction application module, indicating that a configuration is completed.

Figure 4:
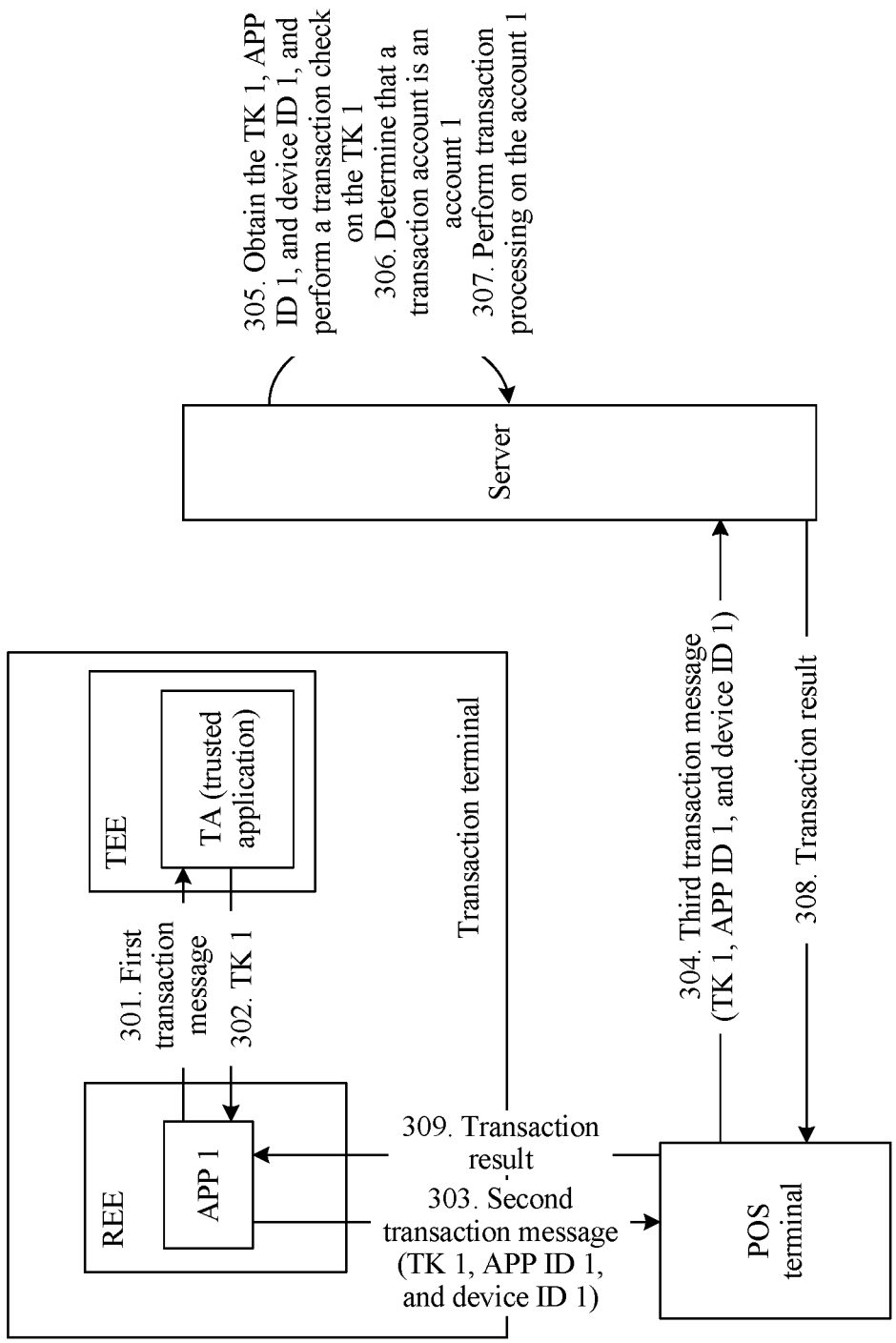
FIG. 4 is another schematic flowchart of a transaction method according to an embodiment of the invention.

Based on the foregoing registration process, the server records the identifier information of the transaction application module, the transaction account information corresponding to the transaction application module, and the third identifier, and can uniquely determine a transaction account according to the first identifier and the third identifier. With reference to the registration process shown in FIG. 3, a transaction method provided by an embodiment of the present invention is described in detail by using an example in which a transaction terminal is a device 1, a secure function module is a TA (trusted application), and a transaction application module is an APP 1. As shown in FIG. 4, the method specifically includes the following steps:

301. A TA application receives a first transaction message sent by an APP 1.

Specifically, the first transaction message carries a first identifier used for identifying the APP 1 and/or a secure transaction data requirement parameter requested by the APP 1. For example, the first identifier may be an AID 1. The secure transaction data requirement parameter is used to instruct the secure function module to provide secure transaction data corresponding to the secure transaction data requirement parameter. The secure transaction data requirement parameter includes at least one of the following parameters: a secure transaction data length parameter or a secure transaction data encryption type parameter, where the secure transaction data length parameter is used to indicate a required length of the secure transaction data provided by the secure function module, and the secure transaction data encryption type parameter is used to indicate a type of the secure transaction data provided by the secure function module.

302. The TA application generates a TK 1 locally, and sends the TK 1 to the APP 1.

It should be noted that, herein the TA application may obtain the secure transaction data TK 1 from a local TEE of the device 1, or may obtain the secure transaction data TK 1 through calculation by using a specific rule and an encryption algorithm.

The TK 1 is the secure transaction data corresponding to the APP 1. In a specific implementation, the TA application may obtain the TK 1 in any one of the foregoing six implementations provided by Embodiment 1. Details are not described again herein.

Specifically, the TK 1 may be obtained in the following manners:

Manner 1: Use one of at least one piece of first secure processing data corresponding to the APP ID 1 as the secure transaction data.

The first secure processing data is generated by a server for the first identifier in the transaction terminal, and is stored in the trusted execution environment.

Manner 2: Determine a first rule corresponding to the APP ID 1, where the first rule includes a first algorithm and a first numeric value, calculate (a first numeric value plus a current time) by using the first algorithm, to obtain second secure processing data, and use the second secure processing data as the secure transaction data.

The first algorithm may be a hash algorithm, and the first numeric value may be a character string or a numeral.

It should be noted that, the secure function module may further form the secure transaction data according to the APP ID 1 and the second secure processing data. For example, if the first identifier is 12348765, and the second secure processing data is abcdefgh, the TK 1 (secure transaction data) may be 1234abcdefgh or 12348765abcdefgh.

Manner 3: Determine a second rule corresponding to the APP ID 1, where the second rule includes a first encryption algorithm and at least one first key, obtain third secure processing data by encrypting first data (including transaction information and/or an identifier TKID of the TA application) according to the second rule, and use the third secure processing data as the secure transaction data. The transaction information is secure auxiliary data information or service processing related data information that is used in a transaction process, for example, security verification data or transaction settlement data. The transaction message is obtained by the secure function module from the transaction application module, and the transaction message may be carried in the first transaction message, or is sent by the transaction application module to the secure function module by using another message after the first transaction message.

Herein the first encryption algorithm may be a symmetric encryption algorithm or an asymmetric encryption algorithm.

Manner 4: Use one of at least one piece of fourth secure processing data corresponding to the secure transaction data requirement parameter as the secure transaction data.

The fourth secure processing data is generated by the server for the secure transaction data requirement parameter in the transaction terminal, and is stored in the trusted execution environment. The secure transaction data requirement parameter is the secure transaction data length parameter and/or the secure transaction data encryption type parameter carried in the first transaction message.

Manner 5: Generate fifth secure processing data according to a third rule corresponding to the secure transaction data requirement parameter, and use the fifth secure processing data as the secure transaction data.

The third rule includes a second algorithm (such as a hash algorithm) and a second numeric value (such as a character string or a numeral).

Manner 6: Obtain sixth secure processing data by encrypting second data according to a fourth rule corresponding to the secure transaction data requirement parameter, and use the sixth secure processing data as the secure transaction data.

Herein the second data includes transaction information and/or the second identifier, and the transaction information is obtained by the secure function module from the transaction application module. The fourth rule includes a second encryption algorithm and at least one second key, and the second encryption algorithm may be a symmetric encryption algorithm or an asymmetric encryption algorithm. The transaction information is secure auxiliary data information or service processing related data information that is used in a transaction process, for example, security verification data or transaction settlement data. The transaction message is obtained by the secure function module from the transaction application module, and the transaction message may be carried in the first transaction message, or is sent by the transaction application module to the secure function module by using another message after the first transaction message.

303. The APP 1 submits a second transaction message to a POS terminal.

It should be noted that, herein the POS terminal is the acquiring terminal in the present invention. In addition, the second transaction message includes the secure transaction data TK 1, the first identifier APP ID 1 (used to identify the APP 1) and a third identifier device ID 1 (device ID 1). The device ID 1 is used to identify the transaction terminal.

304. The POS terminal submits a third transaction message to a server.

The server may be an acquiring bank payment server (acquiring bank payment server) corresponding to the transaction application module and/or a server corresponding to the secure function module. Specifically, the POS terminal sends, to the acquiring bank payment server (namely, a payment server of a card issuing bank) corresponding to the APP 1, the second transaction message submitted by the APP 1, or the POS terminal sends, to the server corresponding to the TA, the second transaction message submitted by the APP 1. For example, if the APP 1 is a transaction application of a bank A, the POS terminal sends, to a payment server of the bank A, the second transaction message submitted by the APP 1, or the POS terminal sends, to the server corresponding to the TA, the second transaction message submitted by the APP 1. It should be noted that, the acquiring bank payment server and the server corresponding to the TA may further cooperate to process the secure transaction data. For example, if the APP 1 is the transaction application of the bank A, after the POS terminal sends, to the payment server of the bank A, the second transaction message submitted by the APP 1, the payment server of the bank A may send the secure transaction data, the first identifier, and the third identifier in the second transaction message to the server corresponding to the TA, for processing the secure transaction data, obtain a processing result, and perform subsequent transaction processing.

In addition, the third transaction message may be the second transaction message, or is information generated by the POS terminal according to the second transaction message. The third transaction message includes the secure transaction data TK 1, the first identifier APP ID 1, and the third identifier device ID 1, and certainly may further include information such as a password and a transaction amount.

305. The server receives the third transaction message, obtains the TK 1, an APP ID 1, and a device ID 1, and performs a transaction check on the TK 1.

In a specific implementation, corresponding to different manners of obtaining the TK 1 by the TA application, different transaction manners may be used by the server, including:

Manner 1: The server determines corresponding seventh secure processing data according to the APP ID 1 and the device ID 1; if the seventh secure processing data is the same as the secure transaction data, a result of the transaction check is success; otherwise, the transaction check fails.

Manner 2: The server determines a corresponding fifth rule according to the APP ID 1 and the device ID 1, and then obtains eighth secure processing data according to the fifth rule; if the eighth secure processing data is the same as the secure transaction data, a result of the transaction check is success; otherwise, the transaction check fails.

It should be noted that, the fifth rule includes a third algorithm and a third numeric value, the third algorithm is the same as the first algorithm, and the third numeric value is the same as the first numeric value.

For example, the fifth rule corresponds to the first rule, that is, the same rule is stored in the secure function module and the server, and includes a same numeric value A (such as a numeral or a character string) and a same algorithm B (such as a hash function), and on the server, the fifth rule is associated with the first identifier of the secure function module.

When receiving the first transaction message, the secure function module obtains the secure transaction data by calculating the numeric value A plus the current time by using the algorithm B, and sends the secure transaction data to the server. After receiving the secure transaction data, the server obtains the first identifier (which may be a part of the secure transaction data or may be carried in the second transaction message). Likewise, the data obtained by calculating the numeric value A plus the current time by using the algorithm B is the same as the secure transaction data obtained by the transaction terminal, and a comparison is made between the obtained data and the received secure transaction data to implement verification.

Manner 3: The server determines a corresponding sixth rule according to the APP ID 1 and the device ID 1, and processes the secure transaction data according to the sixth rule to obtain the first data; if the first data includes transaction information satisfying a predetermined requirement (for example, content satisfies an agreed requirement and can be parsed successfully) and/or the second identifier, the check succeeds; otherwise, the check fails.

The transaction information is the secure auxiliary data information or the service processing related data information that is used in the transaction process, for example, the security verification data or the transaction settlement data.

The sixth rule includes a third encryption algorithm and at least one third key, and the sixth rule may be used to perform decryption processing on data encrypted by the second rule to obtain unencrypted data.

Manner 4: The server determines corresponding ninth secure processing data according to the secure transaction data requirement parameter and the device ID 1, and performs the transaction check on the secure transaction data by using the ninth secure processing data. The ninth secure processing data is generated by the server in advance for the secure transaction data requirement parameter in the transaction terminal corresponding to the third identifier. If the ninth secure processing data is the same as the secure transaction data, a result of the transaction check is success; otherwise, the transaction check fails.

Manner 5: The server determines a corresponding seventh rule according to the secure transaction data requirement parameter and the third identifier, and then obtains tenth secure processing data according to the seventh rule; if the tenth secure processing data is the same as the secure transaction data, a result of the transaction check is success; otherwise, a result of the transaction check is failure.

It should be noted that, the seventh rule includes a fourth algorithm and a fourth numeric value, the fourth algorithm is the same as the second algorithm, and the fourth numeric value is the same as the second numeric value. The third rule is preset by the secure function module or obtained from the server, and is used to obtain the secure transaction data.

Manner 6: The server determines a corresponding eighth rule according to the secure transaction data requirement parameter and the device ID 1, and processes the secure transaction data according to the eighth rule to obtain the second data. If the second data includes transaction information satisfying a predetermined requirement (for example, content satisfies an agreed requirement and can be parsed successfully) and/or the second identifier, a result of the transaction check succeeds; otherwise, a result of the transaction check is failure.

It should be noted that, the eighth rule includes a fourth encryption algorithm and at least one fourth key, and the eighth rule may be used to perform decryption processing on data encrypted by the fourth rule to obtain unencrypted data.

306. The server determines that a result of the transaction check in step 305 is success, and determines, according to the APP ID 1 and the device ID 1, that a transaction account is an account 1 (account 1).

With reference to the description about FIG. 3, it can be learned that the server pre-records identifier information (the first identifier) of the transaction application module, identifier information (the third identifier) of the transaction terminal, and transaction account information corresponding to the transaction application module. That is, the server pre-records the APP ID 1 (namely, the identifier information of the transaction application module), the device ID 1 (namely, the identifier information of the device 1), and the account (account) 1. The account 1 is the transaction account information of the transaction application module, and the corresponding account 1 may be uniquely determined according to the APP ID 1 and the device ID 1. Therefore, the server can determine the corresponding transaction account account 1 according to the APP ID 1 and the device ID 1.

307. The server performs transaction processing on the account 1.

Specifically, transaction processing such as settlement or coupon redeeming is performed on the account 1.

308. The server submits a transaction result to the POS terminal.

309. The POS terminal forwards the transaction result to the APP 1.

In the transaction method provided by this embodiment of the present invention, the secure function module of the transaction terminal receives the first transaction message sent by the transaction application module, obtains the secure transaction data locally from the transaction terminal according to the first transaction message, and sends the secure transaction data to the transaction application module, so that the secure transaction data is submitted to the server for determining the transaction account and performing corresponding transaction processing. In the prior art, during a transaction in HCE, secure transaction data must be obtained online, and the transaction is limited by network conditions. When the network conditions are relatively poor, the secure transaction data cannot be obtained, and further, the transaction cannot be performed, and transaction efficiency is relatively low. In contrast, in the method provided by the present invention, the secure transaction data does not need to be obtained online during the transaction, and the transaction can be performed according to the locally obtained secure transaction data. Therefore, the transaction is not limited by the network conditions, and transaction efficiency is improved, while transaction security is ensured. In addition, there is no need to develop different secure function modules for every transaction application module, and therefore, industrial costs are reduced.

Embodiment 3

Figure 5:
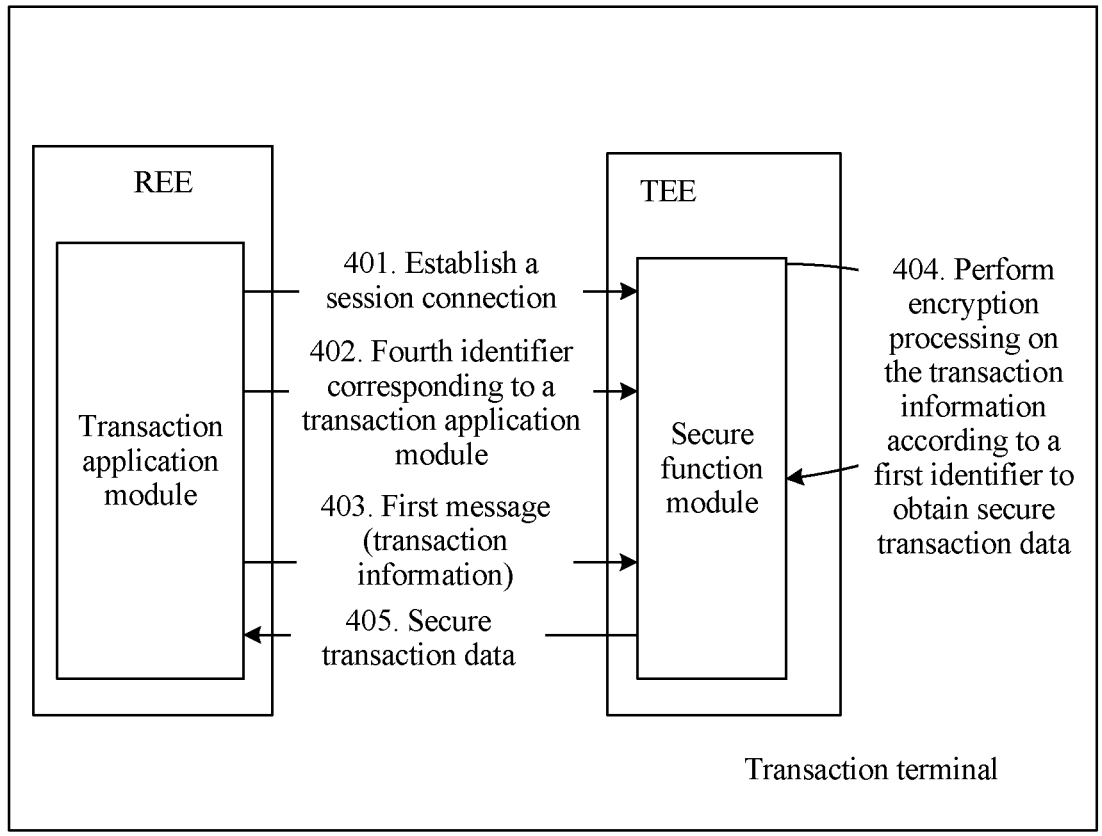
FIG. 5 is a schematic flowchart of a transaction information processing method according to an embodiment of the invention.

This embodiment of the present invention provides a transaction information processing method. The method is applied to a transaction terminal having a trusted execution environment. The transaction terminal includes a secure function module and at least one transaction application module. The secure function module runs in the trusted execution environment. As shown in FIG. 5, the method includes the following steps:

401. The secure function module establishes a session connection to the transaction application module.

402. Obtain a fourth identifier corresponding to the transaction application module.

The fourth identifier is used to identify the transaction application module or a virtual card currently used by the transaction application module. It should be noted that, the transaction application module is a transaction application module that is currently running in an REE in the transaction terminal; the virtual card is a software entity that has no physical medium and can be loaded to a host card emulation application and interact with a POS by using a communications link provided by the terminal, to complete payment. The virtual card may be generated depending on a physical card issued by a bank, or may be a virtual card that is issued by a bank and has no physical medium. Preferably, the fourth identifier may be an AID of the virtual card loaded by the transaction application module and/or a certificate of the transaction application module and a digital signature. The transaction information includes fee deduction information (for example, an authorized amount or a terminal verification result) received by the transaction application module from the POS and virtual card information stored by the transaction application module. The virtual card information includes a transaction counter, an application interaction feature, and the like.

It should be noted that, herein "obtaining" may be that the secure transaction module receives the fourth identifier sent by the transaction application module, or may be that the secure transaction module actively obtains the fourth identifier from the transaction application module.

403. The secure function module obtains a first message sent by the transaction application module.

The first message includes transaction information, and the transaction information is service data in a transaction process. In a specific implementation, the secure function module obtains the first message by using the session connection.

404. The secure function module obtains a service key corresponding to the fourth identifier, and performs encryption processing on the transaction information by using a fifth algorithm and the service key, to obtain secure transaction data.

The fifth algorithm is an encryption algorithm, such as a 3DES algorithm or an AES algorithm. The fifth algorithm is agreed upon by the secure function module and a server. The fifth algorithm may be preset by the secure function module or obtained from the server. It should be noted that, herein the correspondence between the service key and the fourth identifier indicates that the service key is used for processing the transaction information of the transaction application corresponding to the fourth identifier.

405. The secure function module sends the secure transaction data to the transaction application module.

In this way, by invoking the key corresponding to the identifier of the transaction application, the secure function module encrypts the transaction information provided by the transaction application, to locally generate the secure transaction data used for a transaction, and does not need to obtain the secure transaction data online. The transaction is not affected by network conditions, and transaction efficiency is improved. In addition, there is no need to develop different secure function modules for every transaction application module, and therefore, industrial costs are reduced.

It should be noted that, after step 405, the transaction terminal may further send the transaction information including at least the secure transaction data to an acquiring terminal, so that the acquiring terminal forwards the transaction information to the server for transaction processing.

In a preferred embodiment of the present invention, before the secure function module receives the first message sent by the transaction application module, the method further includes:

The secure function module receives a second message sent by the transaction application module, where the second message is used to request generation of payment data, the second message is used to instruct the secure function module to obtain payment data corresponding to the transaction application module, and the payment data includes the service key.

The secure function module performs, by using a sixth algorithm, preset processing on account data corresponding to the transaction application module and a preset device key, to obtain a fifth key, and stores the fifth key in the trusted execution environment as the service key. The device key is an asymmetric key. For different transaction terminals, the device key varies. The sixth algorithm is a key derivation algorithm, such as a 3DES algorithm or an AES algorithm. It should be noted that, different fourth identifiers may correspond to different sixth algorithms. The account data is carried in the second message or obtained by the secure function module from the server. The account data may include a personal account number PAN (Personal Account Number) or a virtual account number. The virtual account number is generated by the server, and the virtual account number corresponds to only one PAN.

It should be noted that, the server also stores the device key. Therefore, the server may obtain the fifth key by using a same method correspondingly, and perform decryption processing on the secure transaction data. Therefore, the server does not need to configure the fifth key for the secure function module, and the secure function module also does not need to send the fifth key to the server after generating the fifth key, thereby avoiding a risk of leaking the fifth key in a transmission process. In addition, the secure function module may also obtain the fifth key without connecting to the Internet, and user experience is enhanced.

In another preferred embodiment of the present invention, that the secure function module obtains a service key corresponding to the fourth identifier specifically includes:

If the secure function module confirms that the service key does not exist, the secure function module processes third data by using a seventh algorithm, to obtain a sixth key, and stores the sixth key in the trusted execution environment, and the secure function module uses the sixth key as the service key, where the use threshold limit includes a use time threshold limit or a use quantity threshold limit, the seventh algorithm is a key derivation algorithm, the third data includes a seventh key, the seventh key is obtained by the secure function module from the server, the sixth key is subject to the use threshold limit, and the seventh key is subject to the use threshold limit; or if the secure function module confirms that the service key does not exist, the secure function module sends a key obtaining request to the server, and receives a response message from the server, where the response message includes an eighth key; and the secure function module obtains the eighth key in the response message, and updates or stores the eighth key in the trusted execution environment, where the use threshold limit includes a use time threshold limit or a use quantity threshold limit, and the eighth key is subject to the use threshold limit.

In another preferred embodiment of the present invention, before the secure function module receives the first message sent by the transaction application module, the method further includes:

A check module of the transaction terminal performs a security check. Herein the security check method includes at least one of a password check or a biological feature check. The biological feature check includes at least one of a fingerprint check, an iris check, a voiceprint check, facial recognition, PPG recognition, or ECG recognition.

If the transaction terminal determines that a result of the security check is success, the transaction terminal sends the first message to the secure function module, or else, does not send the first message to the secure function module.

In the transaction method provided by this embodiment of the present invention, the secure function module of the transaction terminal receives the first transaction message sent by the transaction application module, obtains the secure transaction data locally from the transaction terminal according to the first transaction message, and sends the secure transaction data to the transaction application module, so that the secure transaction data is submitted to the server for determining a transaction account and performing corresponding transaction processing. In the prior art, during a transaction in HCE, secure transaction data must be obtained online, and the transaction is limited by network conditions. When the network conditions are relatively poor, the secure transaction data cannot be obtained, and further, the transaction cannot be performed, and transaction efficiency is relatively low. In contrast, in the method provided by the present invention, the service key can be generated locally in the terminal when being obtained, and there is no need to connect to the Internet and receive a service key configured by the server or synchronize the service key locally generated in the terminal to the server. Therefore, configuration and management steps are simplified, and a risk of leaking the service key during transmission is reduced. The secure transaction data does not need to be obtained online during the transaction, and the transaction can be performed according to the locally obtained secure transaction data. Therefore, the transaction is not limited by the network conditions, and transaction efficiency is improved, while transaction security is ensured. In addition, there is no need to develop different secure function modules for every transaction application module, and therefore, industrial costs are reduced.

Embodiment 4

Figure 6:
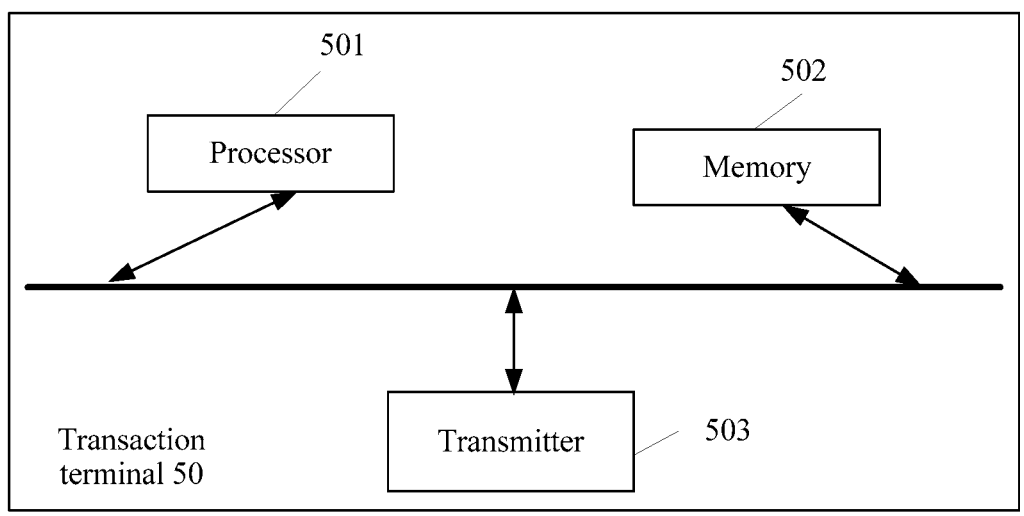
FIG. 6 is a structural block diagram of a transaction terminal according to an embodiment of the present invention.

This embodiment of the present invention provides a transaction terminal 50. As shown in FIG. 6, the transaction terminal 50 includes a processor 501, a memory 502, and a transmitter 503.

The processor 501 is configured to obtain secure transaction data according to a first transaction message, or the first transaction message and a second identifier, where the first transaction message includes a first identifier and/or a secure transaction data requirement parameter, the first identifier is used to identify a transaction application module of the transaction terminal or a virtual card currently used by the transaction application module, the second identifier is used to uniquely identify a secure function module of the transaction terminal, the secure function module runs in a trusted execution environment of the transaction terminal, and the secure transaction data requirement parameter includes at least one of the following parameters: a secure transaction data length parameter or a secure transaction data encryption type parameter, where the secure transaction data length parameter is used to indicate a required length of the secure transaction data provided by the secure function module, and the secure transaction data encryption type parameter is used to indicate an encryption type of the secure transaction data in the provided secure transaction data, for example, encryption or not, or a type of a used encryption algorithm (for example, a symmetric encryption algorithm or an asymmetric encryption algorithm), or a type of a used encryption algorithm (for example, a 3DES algorithm or an AES algorithm), or the like.

The transmitter 503 is configured to send a second transaction message to an acquiring terminal, where the second transaction message includes the secure transaction data, the first identifier, and a third identifier, and the third identifier is used to identify the transaction terminal.

The processor 501 is specifically configured to: use one of at least one piece of first secure processing data corresponding to the first identifier as the secure transaction data, where the first secure processing data is generated by a server for the first identifier in the transaction terminal, and the first secure processing data is obtained from the server in advance and stored in the trusted execution environment; or obtain second secure processing data according to a first rule corresponding to the first identifier, and use the second secure processing data as the secure transaction data, where the first rule is preset or obtained from the server, and the first rule includes a first algorithm and a first numeric value; or obtain third secure processing data by encrypting first data according to a second rule corresponding to the first identifier, and use the third secure processing data as the secure transaction data, where the second rule is preset by the secure function module or obtained from the server, the second rule includes a first encryption algorithm and at least one first key, the first data includes the transaction information and/or the second identifier, the transaction information is sent by the transaction application module to the secure function module, and the transaction information is secure auxiliary data information or service processing related data information that is used in a transaction process; for example, the transaction information includes fee deduction information (for example, an authorized amount or a terminal verification result) received by the transaction application module from a POS and virtual card information stored by the transaction application module, where the virtual card information includes a transaction counter, an application interaction feature, and the like.

The processor 501 is specifically configured to: use one of at least one piece of fourth secure processing data corresponding to the secure transaction data requirement parameter as the secure transaction data, where the at least one piece of fourth secure processing data is generated by a server according to the secure transaction data requirement parameter, obtained from the server in advance, and stored in the trusted execution environment; or generate fifth secure processing data according to a third rule corresponding to the secure transaction data requirement parameter, and use the fifth secure processing data as the secure transaction data, where the third rule is preset or obtained from the server, and the first rule includes a second algorithm and a second numeric value; or obtain sixth secure processing data by encrypting second data according to a fourth rule corresponding to the secure transaction data requirement parameter, and use the sixth secure processing data as the secure transaction data, where the fourth rule is preset or obtained from the server, the fourth rule includes a second encryption algorithm and at least one second key, the second data includes the transaction information and/or the second identifier, and the transaction information is secure auxiliary data information or service processing related data information that is used in a transaction process; for example, the transaction information includes fee deduction information (for example, an authorized amount or a terminal verification result) received by the transaction application module from a POS and virtual card information stored by the transaction application module, where the virtual card information includes a transaction counter, an application interaction feature, and the like.

The transmitter 503 is further configured to submit a registration request message to the server, where the registration request message includes the first identifier, a transaction account corresponding to the transaction application module, and the third identifier, so that the server stores the first identifier, transaction account information corresponding to the transaction application module, and the third identifier.

It should be noted that, the third identifier uniquely corresponds to the second identifier on the server.

The processor 501 is further configured to: before obtaining the secure transaction data according to the first transaction message, or the first transaction message and the second identifier, perform a security check, and determine that a result of the security check is success.

The processor 501 is further configured to: before performing the security check, generate the first transaction message, and determine, according to the first transaction message, that the security check needs to be performed.

The transaction terminal provided by this embodiment of the present invention obtains the secure transaction data locally in the transaction terminal according to the first transaction message, so that the secure transaction data is submitted to the server for determining the transaction account and performing corresponding transaction processing. In the prior art, during a transaction in HCE, secure transaction data must be obtained online, and the transaction is limited by network conditions. When the network conditions are relatively poor, the secure transaction data cannot be obtained, and further, the transaction cannot be performed, and transaction efficiency is relatively low. In contrast, the transaction terminal provided by the present invention does not need to obtain the secure transaction data online during the transaction, and can perform the transaction according to the locally obtained secure transaction data. Therefore, the transaction is not limited by the network conditions, and transaction efficiency is improved, while transaction security is ensured. In addition, there is no need to develop different secure function modules for every transaction application module, and therefore, industrial costs are reduced.

Embodiment 5

Figure 7:
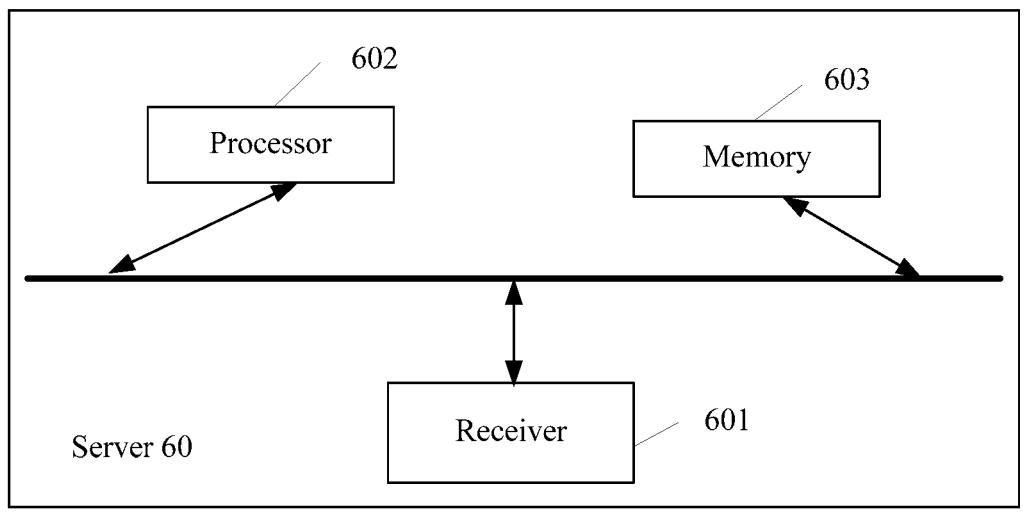
FIG. 7 is a structural block diagram of a server according to an embodiment of the present invention.

This embodiment of the present invention provides a server 60. As shown in FIG. 7, the server 60 includes a receiver 601, a processor 602, and a memory 603.

The receiver 601 is configured to receive a third transaction message from an acquiring terminal, where the third transaction message includes secure transaction data, a first identifier, and a third identifier, the secure transaction data is generated by a secure function module of a transaction terminal, the first identifier is used to identify a transaction application module in the transaction terminal or a virtual card currently used by the transaction application module, and the third identifier is used to identify the transaction terminal.

The processor 601 is configured to obtain the first identifier and the third identifier according to the third transaction message, and perform a transaction check on the secure transaction data.

The processor 602 is further configured to: if determining that a result of the transaction check is success, determine a corresponding transaction account according to the first identifier and the third identifier, and perform transaction processing on the transaction account.

The receiver 601 is further configured to receive, before receiving the third transaction message from the acquiring terminal, registration request information sent by the transaction terminal, where the registration request information includes the first identifier, the transaction account corresponding to the transaction application module, and the third identifier.

The processor 602 is configured to store the first identifier, the transaction account, and the third identifier; where the third identifier uniquely corresponds to a second identifier on the server, and the second identifier is used to identify the secure function module of the transaction terminal.

The processor 602 is specifically configured to: determine corresponding seventh secure processing data according to the first identifier and the third identifier, and perform the transaction check on the secure transaction data by using the seventh secure processing data; and if the seventh secure processing data is the same as the secure transaction data, determine that the transaction check succeeds; otherwise, determine that the transaction check fails; where the seventh secure processing data is generated by the server in advance for the first identifier in the transaction terminal corresponding to the third identifier; or determine a corresponding fifth rule according to the first identifier and the third identifier, then obtain eighth secure processing data according to the fifth rule, and perform the transaction check on the secure transaction data by using the eighth secure processing data; and if the eighth secure processing data is the same as the secure transaction data, determine that the transaction check succeeds; otherwise, determine that the transaction check fails; where the fifth rule includes a third algorithm and a third numeric value, the fifth rule corresponds to a first rule of the secure function module, and the first rule includes a first algorithm and a first numeric value; or determine a corresponding sixth rule according to the first identifier and the third identifier, and perform the check on the secure transaction data according to the sixth rule. Specifically, the server processes the secure transaction data according to the sixth rule to obtain first data; if the first data includes transaction information satisfying a predetermined requirement (for example, content satisfies an agreed requirement and can be parsed successfully) and/or the second identifier, the check succeeds; otherwise, the check fails. The sixth rule includes a third encryption algorithm and at least one third key, the sixth rule corresponds to a second rule of the secure function module in the transaction terminal, and the second rule includes a first encryption algorithm and at least one first key. Herein the correspondence between the sixth rule and the second rule indicates that the sixth rule may be used to perform decryption processing on data encrypted by the second rule to obtain unencrypted data. The second rule is preset by the secure function module or obtained from the server, and is used to obtain the secure transaction data. The transaction information is secure auxiliary data information or service processing related data information that is used in a transaction process, for example, security verification data or transaction settlement data.

The processor 602 is specifically configured to: obtain a secure transaction data requirement parameter and the third identifier, where the secure transaction data requirement parameter includes at least one of the following parameters: a secure transaction data length parameter or a secure transaction data encryption type parameter, where the secure transaction data length parameter is used to indicate a required length of the provided secure transaction data, and the secure transaction data encryption type parameter is used to indicate a type of the secure transaction data provided by the secure function module; and determine corresponding third secure processing data according to the secure transaction data requirement parameter and the third identifier, and perform the transaction check on the secure transaction data by using the third secure processing data; and if the third secure processing data is the same as the secure transaction data, determine that the transaction check succeeds; otherwise, determine that the transaction check fails; where the third secure processing data is generated by the server in advance for the first identifier corresponding to the secure transaction data requirement parameter in the transaction terminal; or determine a corresponding seventh rule according to the secure transaction data requirement parameter and the third identifier, then obtain tenth secure processing data according to the seventh rule, and perform the transaction check on the secure transaction data by using the tenth secure processing data; and if the fourth secure processing data is the same as the secure transaction data, determine that the transaction check succeeds; otherwise, determine that the transaction check fails; where the seventh rule includes a fourth algorithm and a fourth numeric value, the seventh rule corresponds to a third rule of the secure function module in the transaction terminal, and the third rule includes a second algorithm and a second numeric value; or determine a corresponding eighth rule according to the secure transaction data requirement parameter and the third identifier, and perform the transaction check on the secure transaction data according to the eighth rule. Specifically, the server processes the secure transaction data according to the eighth rule to obtain second data; and if the second data includes transaction information satisfying a predetermined requirement (for example, content satisfies an agreed requirement and can be parsed successfully) and/or the second identifier, the result of the transaction check is success; otherwise, the result of the transaction check is failure. The eighth rule includes a fourth encryption algorithm and at least one fourth key, the eighth rule corresponds to a fourth rule of the secure function module in the transaction terminal, and the fourth rule includes a second encryption algorithm and at least one second key. Herein the correspondence between the eighth rule and the fourth rule indicates that the eighth rule may be used to perform decryption processing on data encrypted by the fourth rule to obtain unencrypted data. The fourth rule is preset by the secure function module or obtained from the server, and is used to obtain the secure transaction data. Herein the transaction information is secure auxiliary data information or service processing related data information that is used in a transaction process, for example, security verification data or transaction settlement data.

The server provided by this embodiment of the present invention receives the secure transaction data obtained by the transaction terminal locally, and performs corresponding transaction processing. In the prior art, during a transaction in HCE, secure transaction data must be obtained online, and the transaction is limited by network conditions. When the network conditions are relatively poor, the secure transaction data cannot be obtained, and further, the transaction cannot be performed, and transaction efficiency is relatively low. In contrast, in the method provided by the present invention, the secure transaction data does not need to be obtained online during the transaction, and the transaction can be performed according to the locally obtained secure transaction data. Therefore, the transaction is not limited by the network conditions, and transaction efficiency is improved, while transaction security is ensured. In addition, there is no need to develop different secure function modules for every transaction application module, and therefore, industrial costs are reduced.

Embodiment 6

Figure 8:
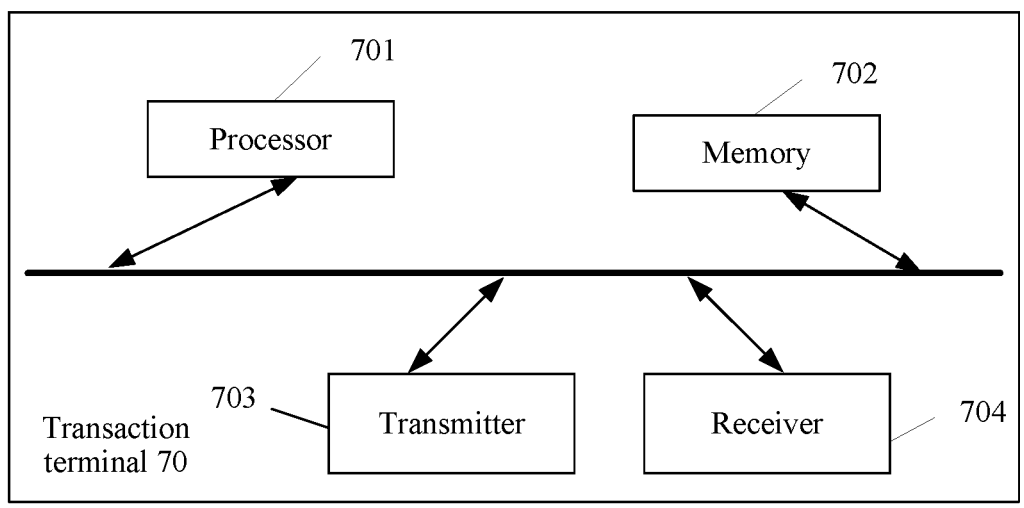
FIG. 8 is another structural block diagram of a transaction terminal according to an embodiment of the present invention.

This embodiment of the present invention provides a transaction terminal 70. As shown in FIG. 8, the transaction terminal includes a processor 701, a memory 702, a transmitter 703, and a receiver 704.

The processor 701 is configured to obtain a fourth identifier, where the fourth identifier is used to identify a transaction application module in the transaction terminal, or the fourth identifier is used to identify a virtual card currently used by the transaction application module; and obtain a first message, where the first message includes transaction information. The virtual card is a software entity that has no physical medium and can be loaded to a host card emulation application and interact with a POS by using a communications link provided by the terminal, to complete payment. The virtual card may be generated depending on a physical card issued by a bank, or may be a virtual card that is issued by a bank and has no physical medium.

The processor 701 is further configured to obtain a service key corresponding to the fourth identifier, and perform encryption processing on the transaction information by using a fifth algorithm and the service key, to obtain secure transaction data.

The processor 701 is further configured to: before obtaining the first transaction message, obtain a second message, where the second message is used to request generation of payment data; and perform, by using a sixth algorithm, preset processing on account data and a preset device key, to obtain a fifth key, and store the fifth key in the trusted execution environment as the service key, where the sixth algorithm is a key derivation algorithm, and the account data is carried in the second message or obtained by the secure function module from a server.

The transmitter 703 is specifically configured to send a key obtaining request to the server.

The receiver 704 is configured to receive a response message from the server, where the response message includes an eighth key.

The processor 701 is configured to: if confirming that the service key exists and exceeds a use threshold limit, obtain the eighth key in the response message, update the service key to the eighth key, and store the service key in the trusted execution environment, where the use threshold limit includes a use time threshold limit or a use quantity threshold limit, and the eighth key is subject to the use threshold limit; or the processor 701 is further configured to: if confirming that the service key exists and exceeds a use threshold limit, process third data by using an eighth algorithm, to obtain a sixth key, update the service key to the sixth key, and store the service key in the trusted execution environment, where the use threshold limit includes a use time threshold limit or a use quantity threshold limit, the eighth algorithm is a key derivation algorithm, the third data includes a seventh key, the seventh key is obtained by the secure function module from the server, the sixth key is subject to the use threshold limit, and the seventh key is subject to the use threshold limit. In a specific implementation, the eighth algorithm is the same as the foregoing seventh algorithm.

The transaction terminal provided by this embodiment of the present invention can obtain the secure transaction data locally. In the prior art, when a transaction terminal performs a transaction in HCE, secure transaction data must be obtained online, and the transaction is limited by network conditions. When the network conditions are relatively poor, the secure transaction data cannot be obtained, and further, the transaction cannot be performed, and transaction efficiency is relatively low. In contrast, in the method provided by the present invention, the secure transaction data does not need to be obtained online during the transaction, and the transaction can be performed according to the locally obtained secure transaction data. Therefore, the transaction is not limited by the network conditions, and transaction efficiency is improved, while transaction security is ensured. In addition, there is no need to develop different secure function modules for every transaction application module, and therefore, industrial costs are reduced.

It should be noted that, the processor in the embodiments of the present invention may be a central processing unit (English: central processing unit, CPU for short).

The receiver may be implemented by an optical receiver, an electrical receiver, a wireless receiver, or any combination thereof. For example, the optical receiver may be a small form-factor pluggable (English: small form-factor pluggable transceiver, SFP for short) receiver (English: transceiver), an enhanced small form-factor pluggable (English: enhanced small form-factor pluggable, SFP+ for short) receiver, or a 10 Gigabit small form-factor pluggable (English: 10 Gigabit small form-factor pluggable, XFP for short) receiver. The electrical receiver may be an Ethernet (English: Ethernet) network interface controller (English: network interface controller, NIC for short). The wireless receiver may be a wireless network interface controller (English: wireless network interface controller, WNIC for short).

Likewise, the transmitter may be implemented by an optical transmitter, an electrical transmitter, a wireless transmitter, or any combination thereof. For example, the optical transmitter may be a small form-factor pluggable transmitter, an enhanced small form-factor pluggable transmitter, or a 10 Gigabit small form-factor pluggable transmitter. The electrical transmitter may be an Ethernet (English: Ethernet) network interface controller. The wireless transmitter may be a wireless network interface controller.

The memory is configured to store program code, and transmit the program code to the processor for executing the following instruction according to the program code. The memory may include a volatile memory (English: volatile memory), for example, a random access memory (English:

random-access memory, RAM for short). The memory may also include a non-volatile memory (English: non-volatile memory), for example, a read-only memory (English: read-only memory, ROM for short), a flash memory (English: flash memory), a hard disk drive (English: hard disk drive, HDD for short), or a solid-state drive (English: solid-state drive, SSD for short). The memory may further include a combination of the foregoing types of memories.

Herein the processor may be the foregoing processor 501 or processor 602 or processor 701. The memory may be the foregoing memory 502 or memory 603 or memory 702. The receiver may be the receiver 601 or the receiver 704. The transmitter may be the transmitter 503 or the transmitter 703.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing apparatus, reference may be made to a corresponding process in the foregoing method embodiments, and details are not described herein again.

The units described as separate parts may or may not be physically separate, and parts displayed as units may be one or more physical units, may be located in one place, or may be distributed on different places. Some or all of the units may be selected according to actual requirements to achieve the objectives of the solutions of the embodiments. In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A transaction method, applied to a transaction terminal having a trusted execution environment (TEE), wherein the transaction terminal comprises a secure function module, a check module and at least one transaction application module, the secure function module runs in the TEE, and the method comprises:
   receiving, by the secure function module, a first transaction message sent by the transaction application module, wherein the first transaction message comprises a first identifier and a secure transaction data requirement parameter, the first identifier is used to identify the transaction application module, and the secure transaction data requirement parameter is used to instruct the secure function module to provide secure transaction data corresponding to the secure transaction data requirement parameter;
   obtaining, by the secure function module, the secure transaction data according to the first transaction message and a second identifier, wherein the second identifier is used to uniquely identify the secure function module;
   sending, by the secure function module, the secure transaction data to the transaction application module;
   processing the secure transaction data through the transaction application module;
   sending, by the transaction application module, a second transaction message to an acquiring terminal, wherein the second transaction message comprises the secure transaction data, the first identifier, and a third identifier, wherein the third identifier is used to identify the transaction terminal;
   performing, by the check module, a security check; and
   determining, by the check module, that a result of the security check is success;
   and, wherein before performing the security check, the method further comprises:
   generating, by the transaction application module, the first transaction message; and
   determining, by the check module according to the first transaction message, that the security check needs to be performed.

2. The method according to claim 1, wherein before the obtaining the secure transaction data, the method further comprises:
   receiving, by the secure function module, transaction information sent by the transaction application module, wherein the transaction information is secure auxiliary data information or service data in a transaction process.

3. The method according to claim 1, wherein the obtaining the secure transaction data comprises:
   using, by the secure function module, one of at least one piece of first secure processing data corresponding to the first identifier as the secure transaction data, wherein the first secure processing data is generated by a server for the first identifier in the transaction terminal, and the first secure processing data is obtained by the secure function module from the server in advance and stored in the TEE.

4. The method according to claim 1, wherein the obtaining the secure transaction data comprises:
   obtaining, by the secure function module, second secure processing data according to a first rule corresponding to the first identifier, and using the second secure processing data as the secure transaction data, wherein the first rule is preset by the secure function module or obtained from a server, and the first rule comprises a first algorithm and a first numeric value.

5. The method according to claim 1, wherein the obtaining the secure transaction data comprises:
    obtaining, by the secure function module, third secure processing data by encrypting first data according to a second rule corresponding to the first identifier, and using the third secure processing data as the secure transaction data, wherein the second rule is preset by the secure function module or obtained from a server, the second rule comprises a first encryption algorithm and at least one first key, and the first data comprises the transaction information and the second identifier.

6. The method according to claim 1, wherein the secure transaction data requirement parameter comprises at least one of the following parameters:
    a secure transaction data length parameter or a secure transaction data encryption type parameter, wherein the secure transaction data length parameter is used to indicate a required length of the secure transaction data provided by the secure function module, and the secure transaction data encryption type parameter is used to indicate a type of the secure transaction data provided by the secure function module.

7. The method according to claim 1, wherein before the receiving a first transaction message sent by the transaction application module, the method further comprises:
    submitting, by the transaction application module, a registration request message to a server, wherein the registration request message comprises the first identifier, transaction account information corresponding to the transaction application module, and the third identifier.

8. A transaction terminal having a trusted execution environment (TEE), wherein the transaction terminal comprises a secure function module, a check module and at least one transaction application module, the secure function module runs in the TEE, and wherein the transaction terminal further comprises a memory and a processor such that when the processor executes machine-readable instructions stored in the memory, the transaction terminal is caused to perform:
    receiving a first transaction message, wherein the first transaction message comprises a first identifier and a secure transaction data requirement parameter, the first identifier is used to identify the transaction application module, and the secure transaction data requirement parameter is used to instruct the secure function module to provide secure transaction data corresponding to the secure transaction data requirement parameter;
    obtaining the secure transaction data according to the first transaction message and a second identifier, wherein the second identifier is used to uniquely identify the secure function module;
    processing the secure transaction data through the transaction application module;
    sending a second transaction message to an acquiring terminal, wherein the second transaction message comprises the secure transaction data, the first identifier, and a third identifier, wherein the third identifier is used to identify the transaction terminal;
    performing a security check; and
    determining that a result of the security check is success; and, wherein before performing the security check, the transaction terminal is further caused to perform:
    generating the first transaction message; and
    determining, according to the first transaction message, that the security check needs to be performed.

9. The transaction terminal according to claim 8, wherein before obtaining the secure transaction data, the transaction terminal is further caused to perform:
    receiving transaction information, wherein the transaction information is secure auxiliary data information or service data in a transaction process.

10. The transaction terminal according to claim 8, wherein obtaining the secure transaction data comprises:
    using one of at least one piece of first secure processing data corresponding to the first identifier as the secure transaction data, wherein the first secure processing data is generated by a server for the first identifier in the transaction terminal, and the first secure processing data is obtained by the secure function module from the server in advance and stored in the TEE.

11. The transaction terminal according to claim 8, wherein obtaining the secure transaction data comprises:
    obtaining second secure processing data according to a first rule corresponding to the first identifier, and using the second secure processing data as the secure transaction data, wherein the first rule is preset by the secure function module or obtained from a server, and the first rule comprises a first algorithm and a first numeric value.

12. The transaction terminal according to claim 8, wherein obtaining the secure transaction data comprises:
    obtaining third secure processing data by encrypting first data according to a second rule corresponding to the first identifier, and using the third secure processing data as the secure transaction data, wherein the second rule is preset by the secure function module or obtained from a server, the second rule comprises a first encryption algorithm and at least one first key, and the first data comprises the transaction information and the second identifier.

13. The transaction terminal according to claim 8, wherein the secure transaction data requirement parameter comprises at least one of the following parameters:
    a secure transaction data length parameter or a secure transaction data encryption type parameter, wherein the secure transaction data length parameter is used to indicate a required length of the secure transaction data provided by the secure function module, and the secure transaction data encryption type parameter is used to indicate a type of the secure transaction data provided by the secure function module.

14. The transaction terminal according to claim 8, wherein before receiving the first transaction message, the transaction terminal is further caused to perform:
    submitting, by the transaction application module, a registration request message to a server, wherein the registration request message comprises the first identifier, transaction account information corresponding to the transaction application module, and the third identifier.

* * * * *